(12) United States Patent
Macpherson et al.

(10) Patent No.: US 11,884,091 B2
(45) Date of Patent: Jan. 30, 2024

(54) DIFFRACTIVE STRUCTURES WITHIN POLYMER SUBSTRATES, THEIR MANUFACTURE AND USE

(71) Applicants: Bank of Canada, Ottawa (CA); The Governing Council of the University of Toronto, Ottawa (CA)

(72) Inventors: Charles Douglas Macpherson, Santa Barbara, CA (US); Badr Omrane, Ottawa (CA); Peter Herman, Toronto (CA); Stephen Ho, Richmond Hill (CA); Sean Magnus Malmberg, Ottawa (CA)

(73) Assignees: Bank of Canada, Ottawa (CA); The Governing Council of the University of Toronto, Toronto (CA)

( * ) Notice: Subject to any disclaimer, the term of this patent is extended or adjusted under 35 U.S.C. 154(b) by 59 days.

(21) Appl. No.: 17/619,296

(22) PCT Filed: Jun. 25, 2020

(86) PCT No.: PCT/CA2020/050884
§ 371 (c)(1),
(2) Date: Dec. 15, 2021

(87) PCT Pub. No.: WO2020/257935
PCT Pub. Date: Dec. 30, 2020

(65) Prior Publication Data
US 2022/0258523 A1    Aug. 18, 2022

Related U.S. Application Data

(60) Provisional application No. 62/866,693, filed on Jun. 26, 2019.

(51) Int. Cl.
*B42D 25/41*    (2014.01)
*B42D 25/328*    (2014.01)
(Continued)

(52) U.S. Cl.
CPC .......... *B42D 25/435* (2014.10); *B23K 26/354* (2015.10); *B23K 26/359* (2015.10);
(Continued)

(58) Field of Classification Search
CPC .... B42D 25/328; B42D 25/41; B23K 26/354; B23K 26/359; B23K 26/55
See application file for complete search history.

(56) References Cited

U.S. PATENT DOCUMENTS

2007/0097472 A1    5/2007    Ha
2015/0291825 A1    10/2015    Read
(Continued)

FOREIGN PATENT DOCUMENTS

DE    102018220099 A1 *    5/2020
JP    2000147228 A    5/2000
(Continued)

OTHER PUBLICATIONS

Sep. 4, 2020—(WO) International Search Report—Appl No. PCT/CA2020/050884.

*Primary Examiner* — Kyle R Grabowski
(74) *Attorney, Agent, or Firm* — Banner & Witcoff, Ltd.

(57) ABSTRACT

Disclosed are optical devices suitable as security devices for document authentication, which comprise at least one two-dimensional array of elongate laser-modified tracks extending within a document substrate that have a distinct optical refractive index compared to the unmodified substrate, which can exhibit excellent diffractive effects. Also disclosed are the use of such devices for document authentication and methods for their production.

26 Claims, 20 Drawing Sheets

(51) Int. Cl.
    *B23K 26/354*     (2014.01)
    *B23K 26/359*     (2014.01)
    *B42D 25/435*     (2014.01)
    *B42D 25/29*     (2014.01)
    *B41M 3/14*     (2006.01)

(52) U.S. Cl.
    CPC ............ *B41M 3/144* (2013.01); *B42D 25/29* (2014.10); *B42D 25/328* (2014.10); *B42D 25/41* (2014.10)

(56) References Cited

U.S. PATENT DOCUMENTS

2017/0023711 A1*   1/2017   Jiang .................... G02B 5/1842
2017/0341812 A1*  11/2017   DeMartino .............. B41M 3/14

FOREIGN PATENT DOCUMENTS

| WO | 2008091898 A1 | 7/2008 | |
| WO | WO-2018042441 A1 * | 3/2018 | ......... B23K 26/0006 |
| WO | 2019077316 A1 | 4/2019 | |
| WO | 2019077317 A1 | 4/2019 | |
| WO | WO-2019077317 A1 * | 4/2019 | ......... B23K 26/0624 |

* cited by examiner

Array Rotation

$0° \leq \theta \leq 360°$

Example of an RGB Pixel

Top view of Canadian flag made of a plurality of RGB Pixel

DIFFRACTIVE STRUCTURES WITHIN POLYMER SUBSTRATES, THEIR MANUFACTURE AND USE

RELATED APPLICATION DATA

This application is a National Stage Application under 35 U.S.C. 371 of co-pending PCT application number PCT/CA2020/050884 designating the United States and filed Jun. 25, 2020; which claims the benefit of U.S. Provisional application No. 62/866,693 and filed Jun. 26, 2019 each of which are hereby incorporated by reference in their entireties.

FIELD OF THE INVENTION

The present invention relates to the field of document substrates, particularly flexible polymer substrates that may be used, for example, in the production of documents and bank notes, and their modification to generate certain optical effects that optionally may form security features for document authentication.

BACKGROUND

Documents of importance or high value are susceptible to counterfeit. Such documents often include specific features or devices that are difficult for counterfeits to replicate. Typically, such devices are applied or adhered to the substrate of the document. Generally, they must be very thin so that they do not protrude from the substrate, and flexible so that they can bend and flex with the substrate during normal use. Examples of such devices include holograms, thin films, and micro-optical features.

There are risks associated with the application or adherence of such features or devices upon document substrates. With such devices, the security and integrity of the document is dependent upon maintaining proper adherence of the device to the document substrate. Adhesives may degrade over time or during document use and fatigue resulting in unintentional partial or total detachment of the device, thus compromising the security value of the document. Even if the adhesive remains intact, surface-applied security features may be more susceptible to wearing or abrasive forces experienced during the lifetime of the document.

Furthermore, counterfeiters have been known intentionally to detach such security devices with subsequent re-attachment of the devices to counterfeit documents, in order to make the counterfeit document appear authentic. For example, counterfeiters have been known to remove holographic features from authentic documents in order to manufacture new counterfeit documents, such as counterfeit passports. In other examples, holographic features of low value bank notes have been removed, and then re-applied to counterfeit bank notes having a higher indicated value.

Some security documents comprise security features integrated or interwoven into the document substrate. As expected, it is more difficult to remove such integral features from the document for counterfeit use. Examples of such features are more common for paper-based document substrates, and include features such as watermarks or substrate-integrated metallic strips as used for example in paper bank notes.

Increasingly, polymers and plastics are used as substrates for security documents. For example, central banks often look to use such plastic or polymer substrates for new generations of bank notes. However, polymer and plastic substrates are known in the art to present certain limitations for security feature integration. With the notable exception of clear polymer windows, the security features of polymer bank notes are typically more confined to those than can be adhered to the polymer surface, or to those that can be printed or embossed upon the polymer surface.

However, more recent efforts have included modifying the polymer substrate directly, to generate certain optical effects. For example, international patent publications WO2019/077316 and WO2019/077317, both published Apr. 25, 2019, disclose limited laser marking of polymer substrates.

There remains a need in the art for improved security features and devices that are integrated into a document substrate. In particular there is a need for security features and devices better suited to polymer and plastic substrates, which are less likely to become detached, worn away, or utilized by counterfeiters.

SUMMARY

It is one object, at least for selected embodiments, to provide a security device as an integral feature of a polymer substrate material. Selected embodiments provide such security devices.

It is another object of the invention, at least in selected embodiments, to provide a method to check whether an item or document is a legitimate or counterfeit version. Selected embodiments provide such methods. The following embodiments are exemplary only.

One embodiment provides a substrate sheet comprising a material having a general refractive index n, the substrate sheet containing at least one ordered two-dimensional array of discrete laser-modified tracks in the material generated by a beam-shaped laser with incident laser light distributed along a laser beam longitudinal axis extending through the substrate sheet, or generated by a beam-shaped laser with laser light distributed along and/or about a laser propagation path extending within the substrate sheet,
each laser-modified track comprising an elongate volume of modified substrate material at least 4 times longer than its narrowest width extending at least partially across a thickness of the substrate sheet, that comprises a modified form of the substrate material, that has a refractive index that is different to the general refractive index n of the substrate sheet from which each laser-modified track originated from, wherein for each two-dimensional ordered array the laser-modified tracks collectively diffract light impinging on the substrate sheet to form an observable shape, image, or region of colour.

Embodiment 2 provides the substrate sheet of embodiment 1, wherein for each laser-modified track the elongate volume of modified substrate material is at least 5 times, or at least 10 times, or at least 15 times, or at least 20 times, longer than its width, and wherein optionally the laser propagation path is linear, curved or helical within the substrate sheet.

Embodiment 3 provides the substrate sheet of embodiment 1, wherein each of the laser-modified tracks is generated by a femtolaser, such as a femtolaser with a pulse duration in the range of 0.1 fs to 100 ps for each laser pulse, with beam-shaping of the femtolaser beam prior to or upon its interaction with the substrate.

Embodiment 4 provides the substrate sheet of embodiment 3, wherein the beam shaping of the femtolaser employs a lens or sheet between a source of the laser beam and a surface of the substrate.

Embodiment 5 provides the substrate sheet of embodiment 4, wherein the beam shaping of the femtolaser employs a silica sheet between the source of the laser beam and the substrate.

Embodiment 6 provides the substrate sheet of embodiment 1, wherein for at least some of the laser-modified tracks the elongate volume of modified substrate material is within the substrate sheet.

Embodiment 7 provides the substrate sheet of embodiment 1, wherein for at least some of the laser-modified tracks the elongate volume of modified substrate material is exposed on at least one surface of the substrate sheet.

Embodiment 8 provides the substrate sheet of embodiment 1, wherein for at least some of the laser-modified tracks the elongate volume of modified material in the substrate sheet includes a void in the substrate sheet, formed post-production of the substrate sheet, by melting, displacement or decomposition of a portion of the material of the substrate sheet.

Embodiment 9 provides the substrate sheet of embodiment 1, having an average thickness of 10-3000 μm, preferably of 50-150 μm.

Embodiment 10 provides the substrate sheet of embodiment 1, wherein the substrate sheet is a polymer sheet, and the each of the at least one ordered two-dimensional array of discrete laser-modified tracks comprises laser-modified tracks in the polymer, generated post-production of the polymer sheet.

Embodiment 11 provides the substrate sheet of embodiment 10, wherein the substrate sheet comprises BOPP, BOPET, PEN, PP, PVDF or related co-polymers such as PVDF-TrFE, or Nylon-55 or 66 or other derivatives.

Embodiment 12 provides the substrate sheet of embodiment 10, wherein the laser-modified tracks independently from one another extend within the polymer sheet from 5% to 100% of the distance between opposite surfaces of the polymer sheet, and optionally extend into one or more additional layers if present adjacent the polymer sheet.

Embodiment 13 provides the substrate sheet of embodiment 10, wherein the polymer of the polymer sheet comprises polymer chains, wherein each elongate volume of modified substrate material for at least some of the laser-modified tracks comprises polymer chains that are at least partially aligned with one another relative to those of unmodified material of the polymer sheet, such that the modified material comprises aligned polymer chains that extend generally non-parallel to the surfaces of the polymer sheet, thereby to cause the modified substrate material to have a different refractive index relative to the general refractive index n for the unmodified material of the polymer sheet.

Embodiment 14 provides the substrate sheet of embodiment 13, wherein the modified material comprises displaced polymer chains to create periodic voids, such that selected laser-modified tracks each comprise a void extending generally non-parallel to the surfaces of the polymer sheet, thereby to cause each of said tracks to have a different refractive index relative to the general refractive index n for the unmodified material of the polymer sheet.

Embodiment 15 provides the substrate sheet of embodiment 13, comprising polymer chains that generally extend or are aligned non-parallel to the surfaces of the polymer sheet, due to melting, displacement or decomposition of the polymer within each elongate volume of modified substrate material in the polymer sheet.

Embodiment 16 provides the substrate sheet of embodiment 13, wherein at least some of the aligned polymer chains within each elongate volume of modified substrate material of each laser-modified track extend or are aligned generally perpendicular to the surfaces of the polymer sheet.

Embodiment 17 provides the substrate sheet of embodiment 13, wherein at least some of the aligned polymer chains within each elongate volume of modified substrate material of each laser-modified track extend to one or both surfaces of the polymer sheet.

Embodiment 18 provides the substrate sheet of embodiment 13, wherein at least some of the aligned polymer chains within each elongate volume of modified substrate material of each laser-modified track extend within the polymer of the polymer sheet, but do not extend to the surfaces of the polymer sheet.

Embodiment 19 provides the substrate sheet of embodiment 13, wherein the laser-modified tracks comprise amorphous regions and/or voids in the substrate that optionally extend to one or both surfaces of the substrate sheet, wherein the amorphous regions and/or voids comprise at least one of amorphous polymer, air, vacuum, polymer decomposition and oxidation products, glassy and amorphous carbon compounds.

Embodiment 20 provides the substrate sheet of embodiment 1, wherein each elongate volume of modified substrate material of each laser-modified track is from 1-5000 nm in width on average, extending partially or entirely through the substrate sheet.

Embodiment 21 provides the substrate sheet of embodiment 1, wherein one two-dimensional ordered array comprises laser-modified tracks that are separated from one another by a periodicity of from 0.01 to 1000 μm, preferably 0.05-10 μm, more preferably 0.1-5 μm, on average by the material of the unmodified material of the substrate sheet that has a general refractive index n.

Embodiment 22 provides the substrate sheet of embodiment 1, wherein the substrate sheet comprises different sections each comprising a plurality of said laser-modified tracks, wherein the tracks within one section have different periodicities, lengths or orientations compared to tracks of at least one other section of the substrate sheet, such that the optical emissions of said different sections that result from diffraction of incident light differ from one another, when the same or equivalent incident light simultaneously impinges upon the different sections.

Embodiment 23 provides the substrate sheet of embodiment 22, comprising pixel-like areas of the substrate at least some of which have different optical diffractive properties from one another, the pixel-like areas preferably from 1-10, 000 μm across, more preferably from 5-100 μm across.

Embodiment 24 provides the substrate sheet of embodiment 23, wherein each pixel-like area of the substrate sheet comprises laser-modified tracks having the same or substantially the same periodicity within each pixel-like area, such that each pixel-like area provides a generally uniform optical diffractive output upon exposure to incident light.

Embodiment 25 provides the substrate sheet of embodiment 23, wherein each pixel-like area comprises multiple sub-sections each of which comprises an ordered array of said laser-modified tracks having a substantially consistent periodicity within each sub-section, the periodicity of the tracks extending within the sub-sections of any given pixel-like area being different to one another, such that the optical diffractive output of any given pixel-like area is defined by a combination of optical diffractive outputs for all subsections of that pixel-like area.

Embodiment 26 provides the substrate sheet of embodiment 25, wherein each pixel-like area comprises sub-sections that each provide a red, green and blue optical diffractive output at selected angles upon exposure to incident light, the relative intensity of the red, green and blue outputs from the subsections of any given pixel-like area determining the colour of the combined optical diffractive output for that pixel-like area at a given angle.

Embodiment 27 provides the substrate sheet of embodiment 22, wherein the laser-modified tracks have a graduating change in at least one of periodicity, spacing, length and orientation across the substrate sheet between one section and another, thereby to provide a graduating change in optical diffractive output properties across the device upon exposure to incident light.

Embodiment 28 provides the substrate sheet of embodiment 1, wherein at least some of the laser-modified tracks extend at least partially across the thickness of the substrate sheet in non-perpendicular and/or non-linear path relative to the surfaces of the substrate sheet.

Embodiment 29 provides the substrate sheet of embodiment 1, wherein at least some of the laser-modified tracks extend at different depths within and across a thickness of the substrate sheet relative to one another.

Embodiment 30 provides the substrate sheet of embodiment 1, comprising two or more ordered two-dimensional arrays of discrete laser-modified tracks, with the arrays at different depths relative to one another across a thickness of the substrate sheet.

Embodiment 31 provides the substrate sheet of embodiment 30, wherein a first array of laser-modified tracks at least partially overlies a second array of laser-modified tracks in the substrate sheet, when the substrate sheet is viewed in plan view from one side thereof.

Embodiment 32 provides the substrate sheet of embodiment 31, wherein the optical diffractive output of one of the first and second arrays is further diffracted by the other of the first and second arrays, when the substrate sheet is exposed to incident light.

Embodiment 33 provides the substrate sheet of embodiment 31, wherein the optical diffractive output of the first and second arrays, when viewed concurrently, exhibits an interference or diffractive optical effect, such as Littrow configuration or grating layers aligned on Talbot self images planes.

Embodiment 34 provides the substrate sheet of any one of embodiments 31 to 33, comprising laser-modified tracks of overlapping arrays at different depths within the substrate, formed concurrently by a single laser pulse with laser energy distributed along a laser beam longitudinal axis extending through the substrate sheet focused simultaneously at said different depths within the substrate sheet.

Embodiment 35 provides the substrate sheet of embodiment 1, further comprising one or more additional layers that partially or entirely overlay the substrate material, the one or more additional layers each independently selected from a polymer layer, a reflective layer, a refractive layer, a diffractive filter, a transmissive filter, a protective layer, an overcoat, an adhesion promoter layer, an ink, an optical interference layer and an optical interference stack.

Embodiment 36 provides a use of the substrate sheet of any one of embodiments 1 to 35 as a security feature of a security document, or as a security document.

Embodiment 37 provides a security document comprising, as a security feature, the substrate sheet of any one of embodiments 1 to 35.

Embodiment 38 provides a method for the manufacture of a security document or security device, the method comprising the steps of:

providing a substrate sheet comprising a substrate sheet material;

irradiating the substrate sheet at a plurality of discrete positions across a planar side of the substrate sheet corresponding to a two-dimensional array, with a laser beam from a laser, such as a femtolaser, whilst modifying the shape of the laser beam prior to or upon its interaction with the substrate sheet so that the incident laser light is at least partially distributed along and/or about a laser propagation path extending within the substrate sheet;

to at least partially or temporarily melt, displace or decompose at least a portion of the substrate material at or within an elongate volume of the substrate sheet material about the laser beam longitudinal axis, corresponding to each of said discrete positions, thereby to generate an array of laser-modified tracks within the substrate material, each comprising an elongate volume of modified substrate material at least 4 times longer than its width extending at least partially across a thickness of the substrate sheet, where the modified form of the substrate material has a refractive index that is different to the general refractive index n of the unmodified substrate;

wherein each two-dimensional ordered array of laser-modified tracks thus produced collectively diffract light impinging on the substrate sheet to form an observable shape, image, or region of colour.

Embodiment 39 provides the method of embodiment 38, wherein the laser is a femtolaser that has a pulse duration in the range of 0.1 fs to 100 ps.

Embodiment 40 provides the method of embodiment 38, wherein in the step of irradiating the laser and the substrate sheet are movable relative to one another to expose said discrete positions on the polymer sheet to the pulses of laser radiation.

Embodiment 41 provides the method of embodiment 38, wherein the laser beam is split into multiple beams prior to its interaction with the substrate, each corresponding to one of the discrete positions on the substrate sheet.

Embodiment 42 provides the method of embodiment 38, wherein the substrate sheet is irradiated with multiple lasers, each with modified laser beam shape or focus, simultaneously, to generate the array of laser-modified tracks.

Embodiment 43 provides the method of embodiment 38, wherein the modifying of the shape or focus of the laser beam comprises passing the laser beam through a silica lens or plate prior to its interaction with the substrate sheet.

cross sectional of the BOPP film embedded with elongated tracks; and d) magnified cross sectional image showing laser-modified tracks that include morphology change to the BOPP film.

Figure 4:
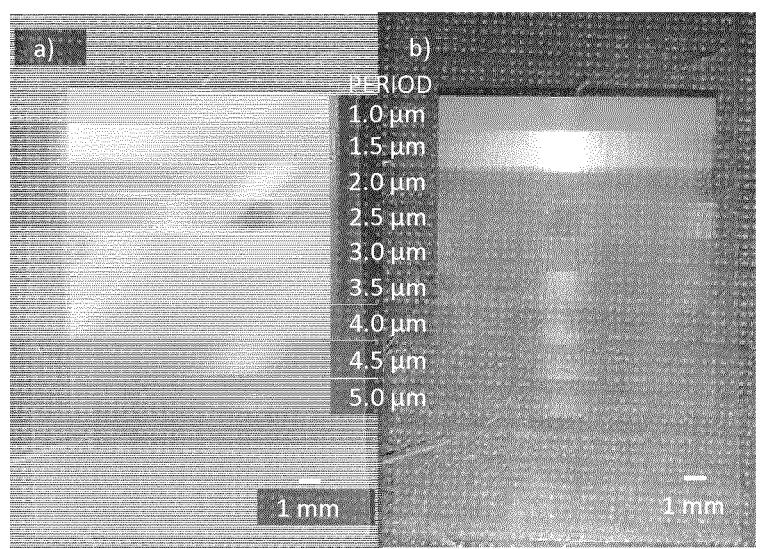

FIG. 4: Examples of large area, 2-D arrays of elongate laser-modified tracks embedded in BOPP, recorded with optical camera, BOPP illuminated with a white LED at a) a slight tilting angle from the left side and b) normal incidence with a slight pitch to show colouring effect from arrays with different grating periods. Note that some grating periods and angles show nearly no diffraction, and therefore multiple colours and with varying brightness can be generated by the laser-modified track array, as required.

Figure 5:
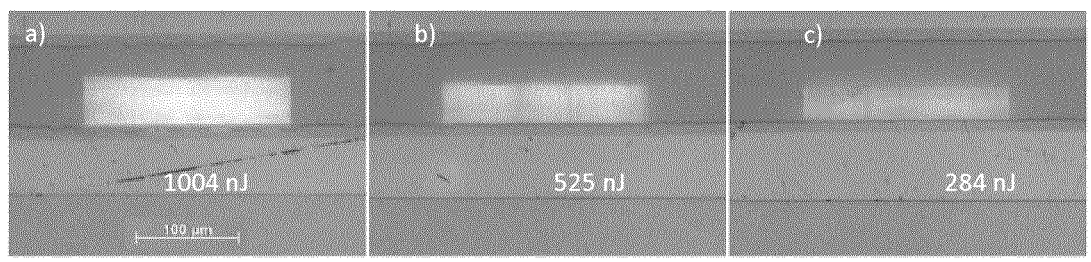

FIG. 5: Scanning electron microscope images showing the cross sections of the embedded elongate laser-modified tracks fabricated with pulse energies of a) 1004 nJ, b) 525 nJ, and c) 284 nJ. The laser was focused first through a 2-mm thick fused silica. The grating laser-modified track is formed near the bottom BOPP samples of ~70-μm thickness with a period of 2-μm.

Figure 6:
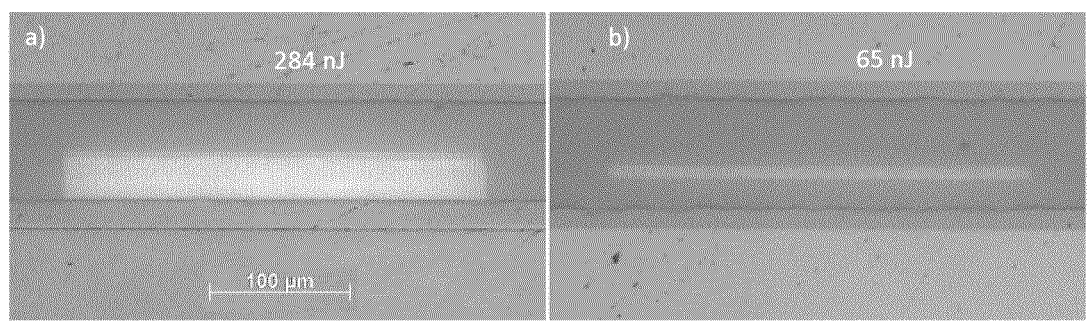

FIG. 6: Scanning electron microscope images showing the cross sections of a single row of embedded laser-modified tracks from a 2D array fabricated with a period of 3 μm and pulse energies of a) 284 nJ and focusing first through a 2-mm thick fused silica and b) 65 nJ without the fused silica. The laser-modified track length increases from ~7 μm in b) to ~50 μm in a) to spherical aberration by the fused silica plate.

Figure 7:
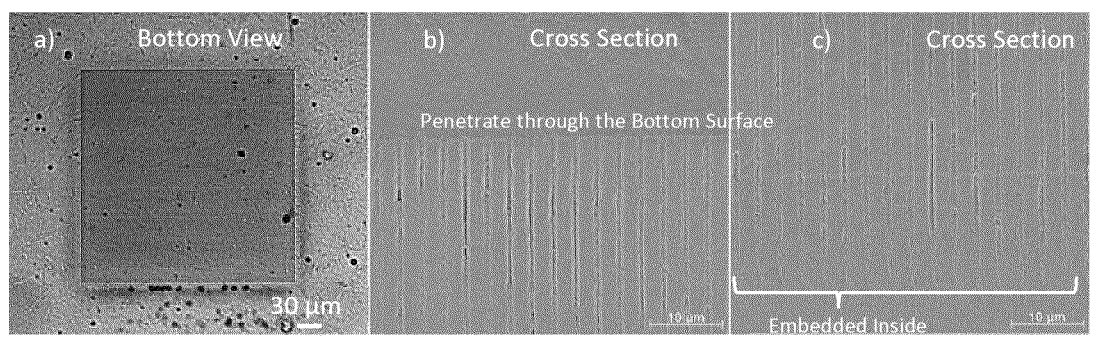

FIG. 7: Array of elongated laser-modified tracks fabricated in 2D array inside BOPP with a pulse energy of 1004 nJ that penetrate through the bottom surface with optical microscope image a) showing the bottom surface with ablation debris, SEM image b) showing the cross section at the bottom surface with holes opening at the surface, and c) showing the part of the laser-modified track embedded inside the BOPP film, not breaking the top surface.

Figure 8A:
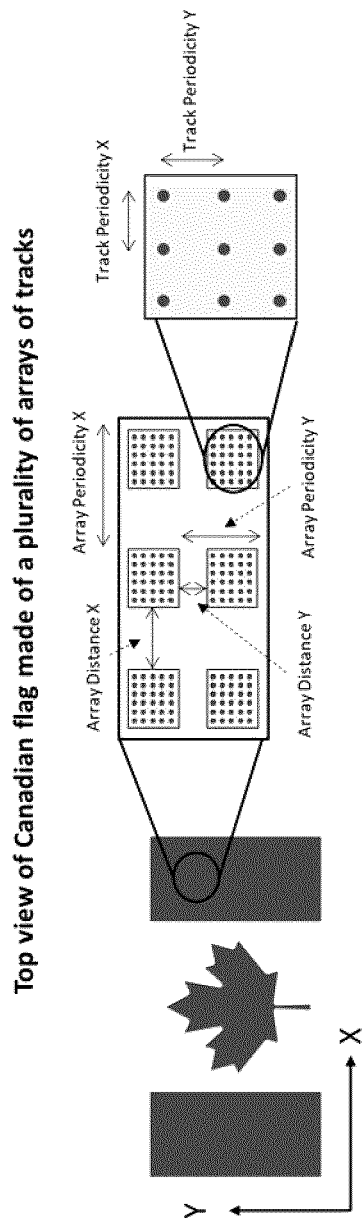

FIG. 8a illustrates schematically the formation of diffractive red stripes in the Canadian flag using array of laser modified tracks with a given track periodicity and array periodicity in the x and y directions.

Figure 8B:
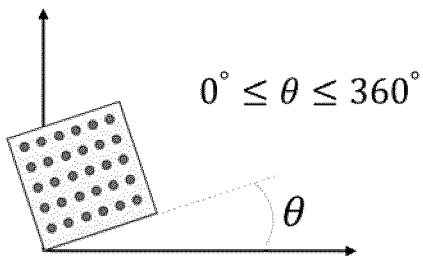

FIG. 8b illustrates schematically how a laser modified track array can optionally be rotated at any angle with respect to the horizontal image plane to modify the observed diffractive light output from the array.

Figure 8C:
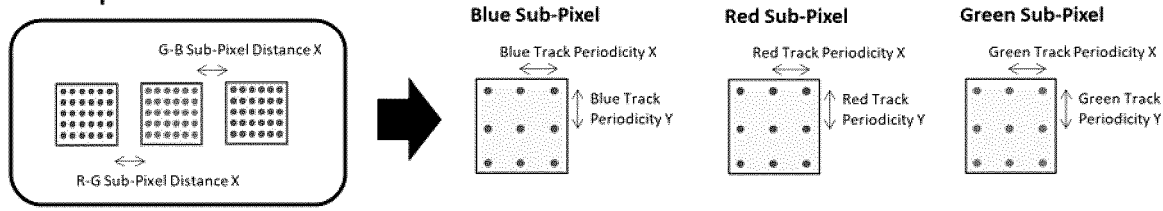
Figure 8C:
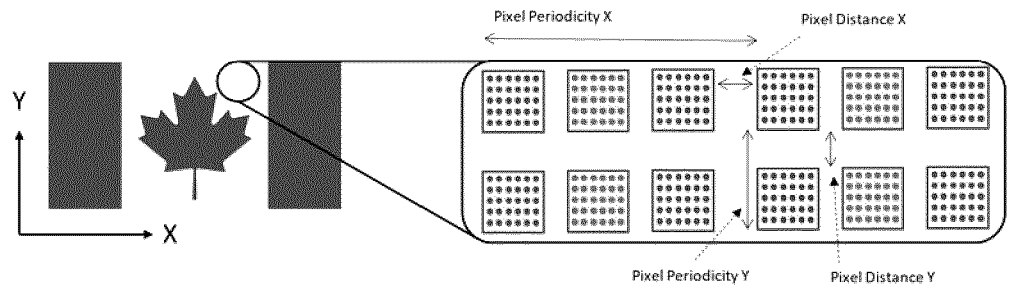

FIG. 8c illustrates schematically the formation of the white area within the Canadian flag by a series pixel arrays containing red, green and blue subpixels arrays with each subpixel array containing the needed track periodicity to generate red, green or blue diffracted light output for each subpixel. The output of the pixel is a sum of the RGB subpixel diffractive output.

Figure 8D:
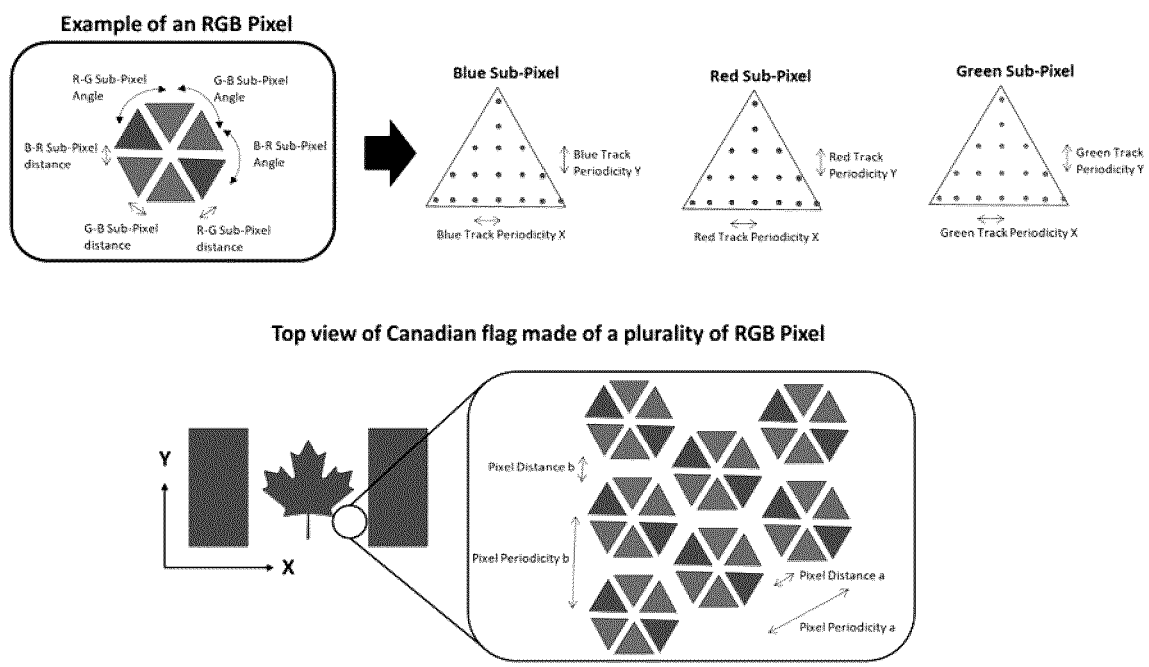

FIG. 8d illustrates schematically an alternative pixel design consisting of hexagonal shaped subpixel arrays that can generate the combined RGB diffractive light output for the white portion of the Canadian flag. The pixels' array periodicity and distance are identified in the illustration.

Figure 9:
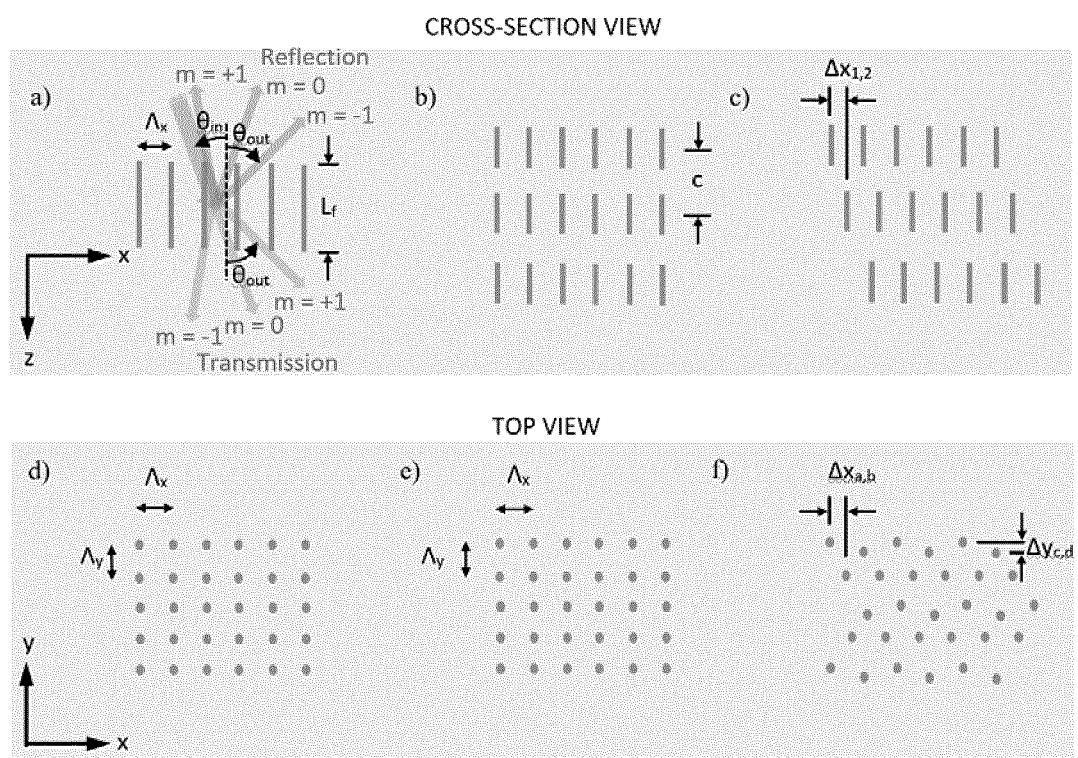

FIG. 9 provides a schematic illustration showing various arrangements of laser-modified tracks in two-dimensional periodic grid in cross-section view (a-c) and top view (d-f).

Figure 10:
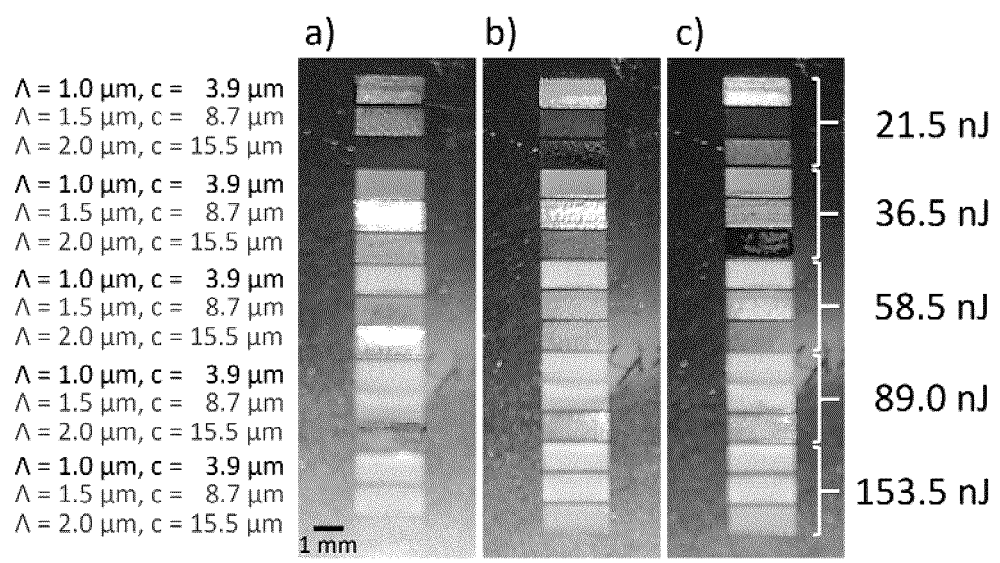

FIG. 10 provides photos recorded from Talbot gratings having 3 layers of symmetric 2-D array of short laser-modified tracks generated with a femtosecond laser at a wavelength of 515 nm and pulse energies of 21.5 nJ, 36.5 nJ, 58.5 nJ, 89.0 nJ, and 153.5 nJ.

Figure 11:
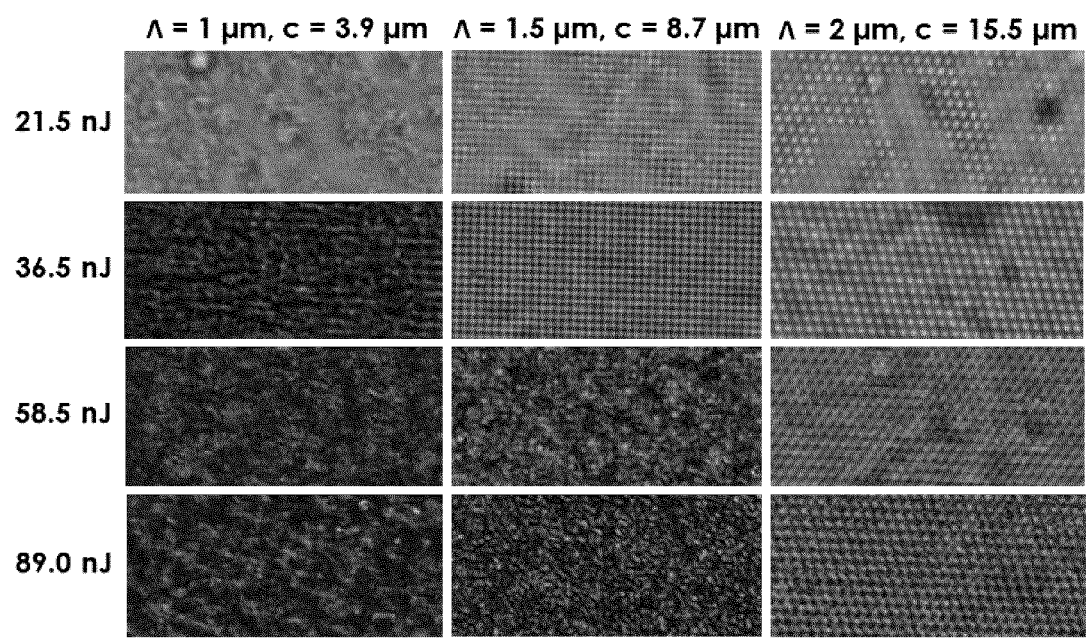

FIG. 11 provides optical microscope images showing the top view of a polymer sample after patterning of a 3D volume grating of short filaments, formed in three layers with a laser at pulse energies of from 21.5 nJ to 89.0 nJ. The filaments were aligned periodically with symmetric transverse periods $\Lambda = \Lambda_x = \Lambda_y$ and Talbot period, c, varied as indicated.

Figure 12:
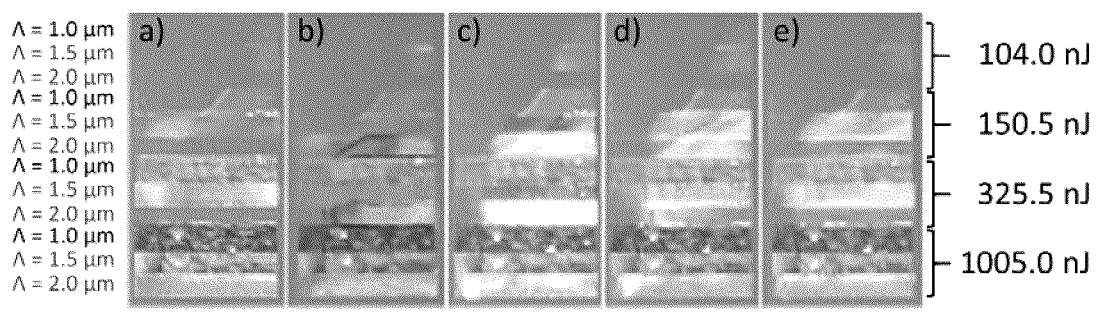

FIG. 12 shows camera images of reflections from fluorescent lamps made by 70-μm thick polyethylene terephthalate (PET) film observed at varying tilting angles of the sample with respect to fixed camera and light source positions. The PET film was embedded with a series of symmetric 2-D arrays of filament tracks (rectangular zones stacked vertically), formed by a femtosecond laser.

Figure 13:
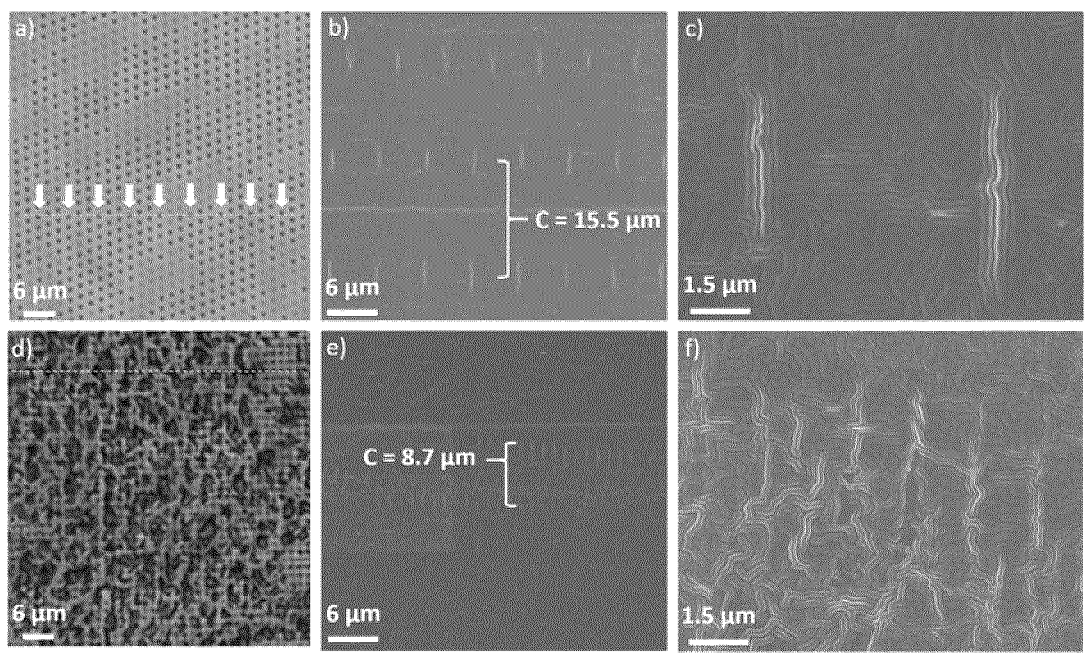

FIG. 13 shows optical top views (a, d) and cross-sectional SEM (b, c, e, f) images of two examples of a three-dimensional grating structure of filaments formed over 3 layers near the middle of the 70-μm thick BOPP substrate. The examples demonstrate Talbot configurations with hexagonal crystal symmetry in (a) and tetragonal crystal structure in (d), and periodicities laterally of $a = b = \Lambda = 2$ μm (top view in a) and 1.5 μm (top view in d) and longitudinally of $c = 15.5$ μm (cross-sectional views in b, c) and 8.7 μm (cross-sectional views in e, f).

Figure 14:
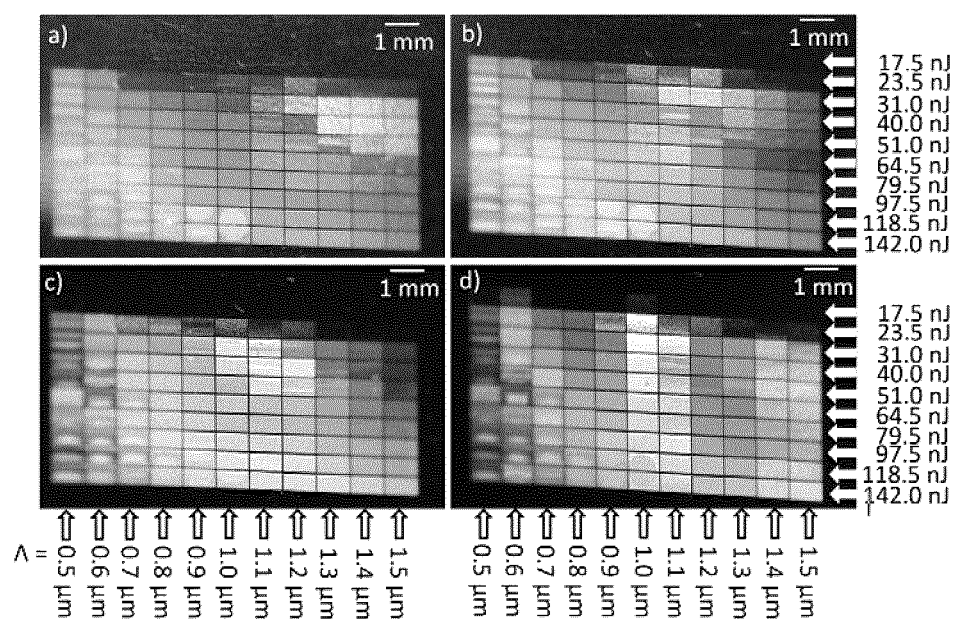

FIG. 14 shows photos recorded from single layer of a symmetric 2-D array of short laser modification tracks generated in BOPP with a femtosecond laser at a wavelength of 515 nm with variable pulse energies as indicated on the right side of the figure. All four images were recorded from the same sample, with varying incident angle while irradiated with a fixed incandescent light and camera angle in reflection mode (a-b) and transmission mode (c-d).

Figure 15:
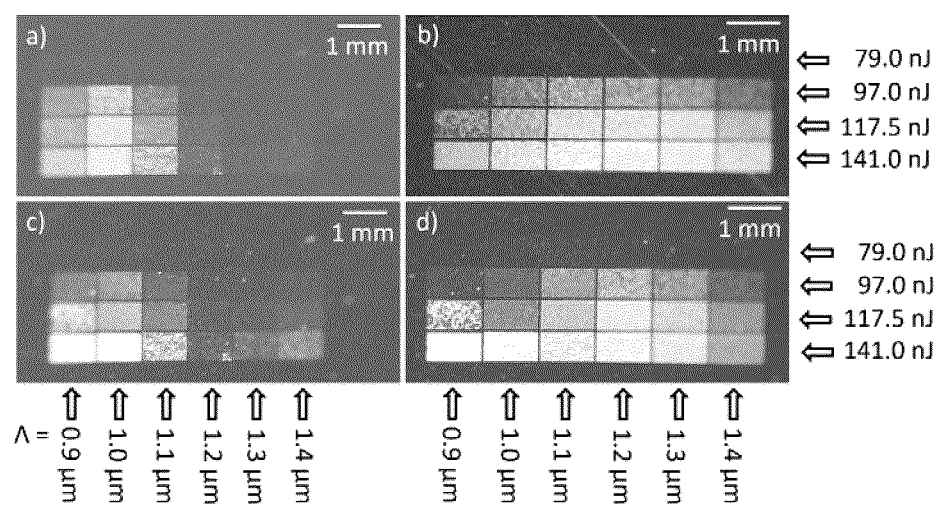

FIG. 15 shows photos recorded from single layer of symmetric 2-D array of long laser modification tracks in BOPP generated with a femtosecond laser at a wavelength of 515 nm and pulse energies ranging from 79.0 nJ to 141.0 nJ (from the top row to the bottom) as indicated on the right side of the figure.

Figure 16:
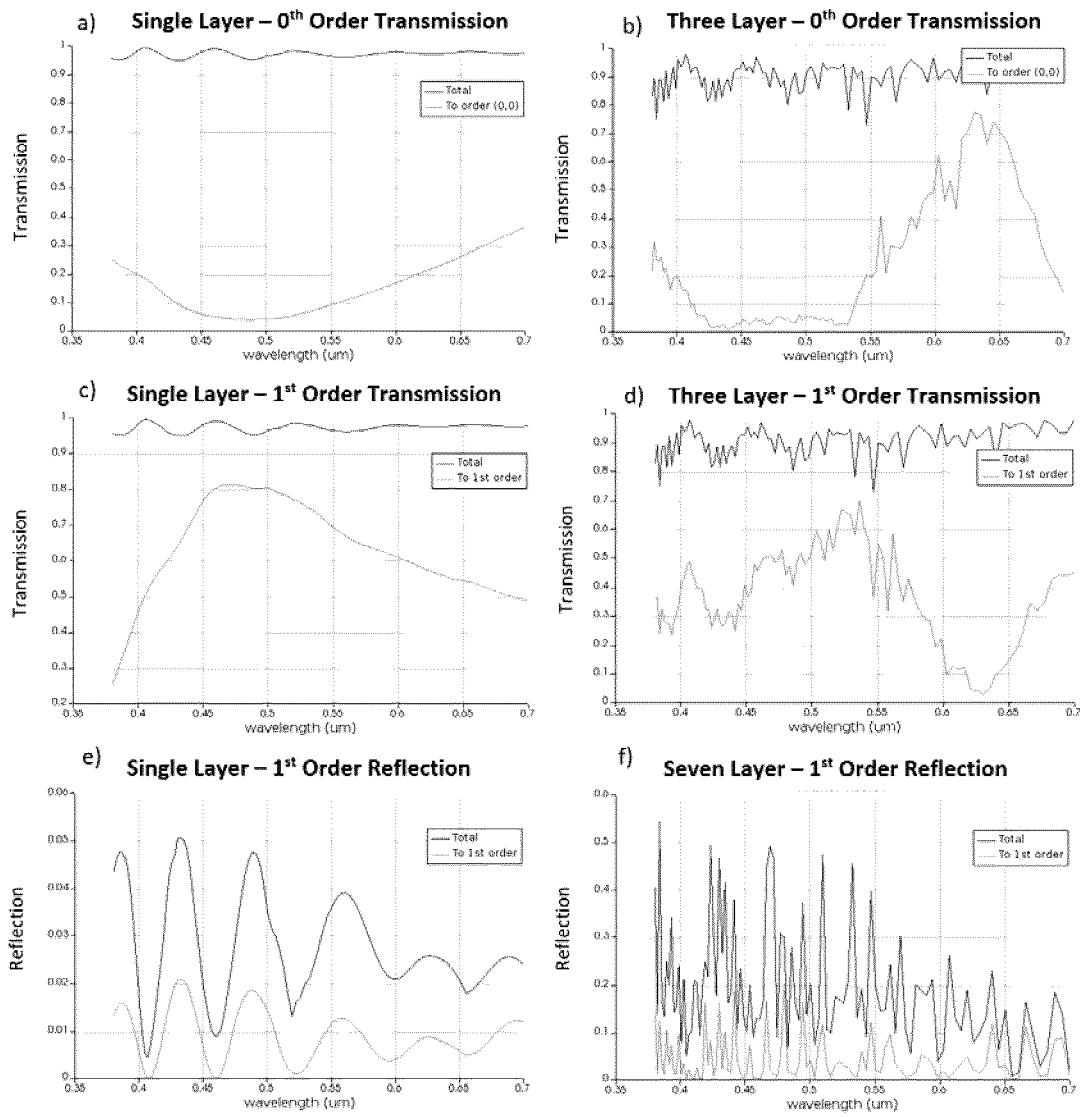

FIG. 16 plots the diffraction efficiency expected by FDTD simulation from periodic arrays of filaments that have been opened into voids, providing a high refractive index contrast of $\Delta n = 0.46$.

Figure 17:
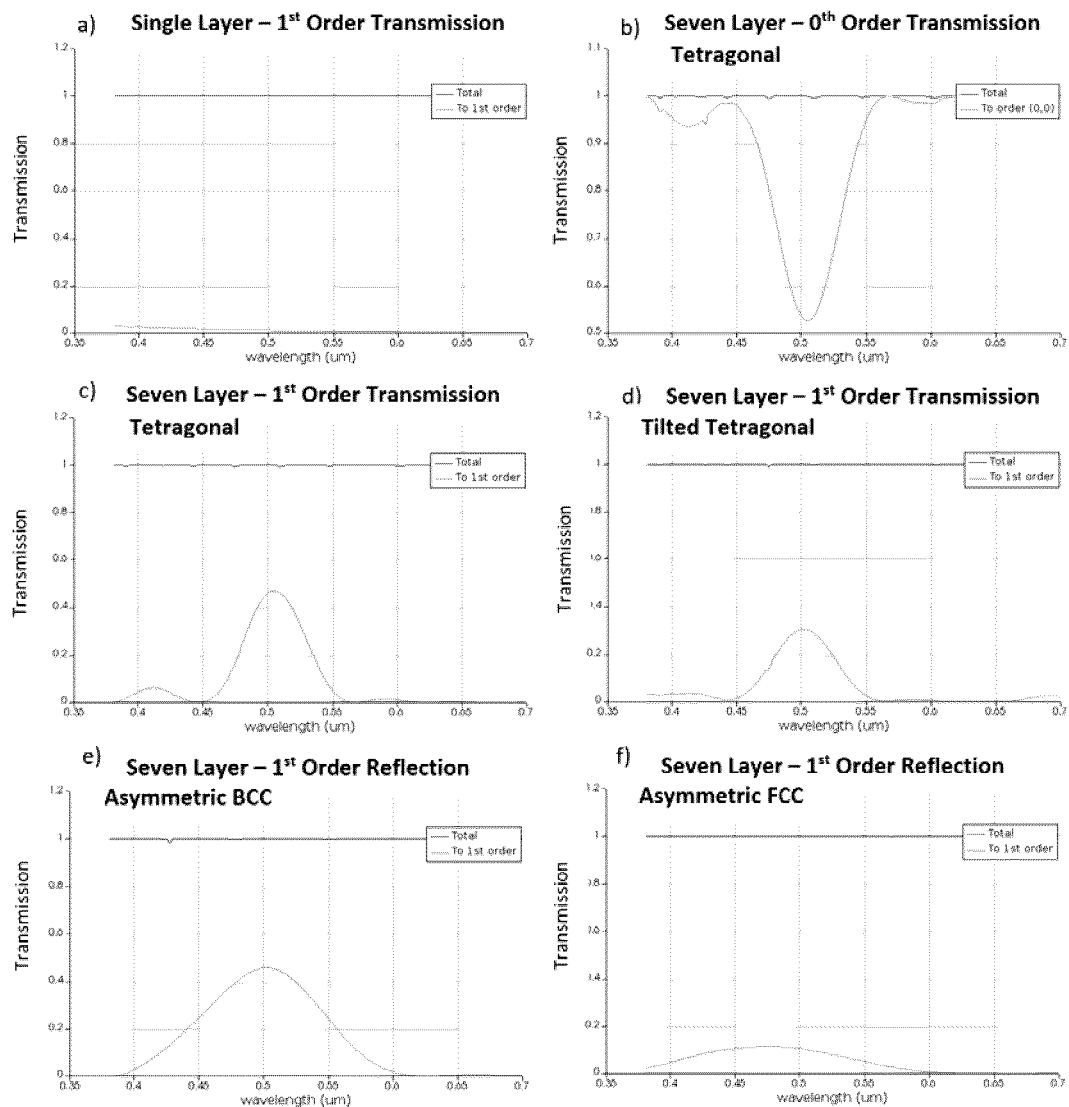

FIG. 17 presents the transmission spectra generated from single (a) and seven layered (b-f) filament arrays based on filaments forming in BOPP (n=~1.5) and having a low refractive index contrast of $\Delta n = 0.033020$.

Figure 18:
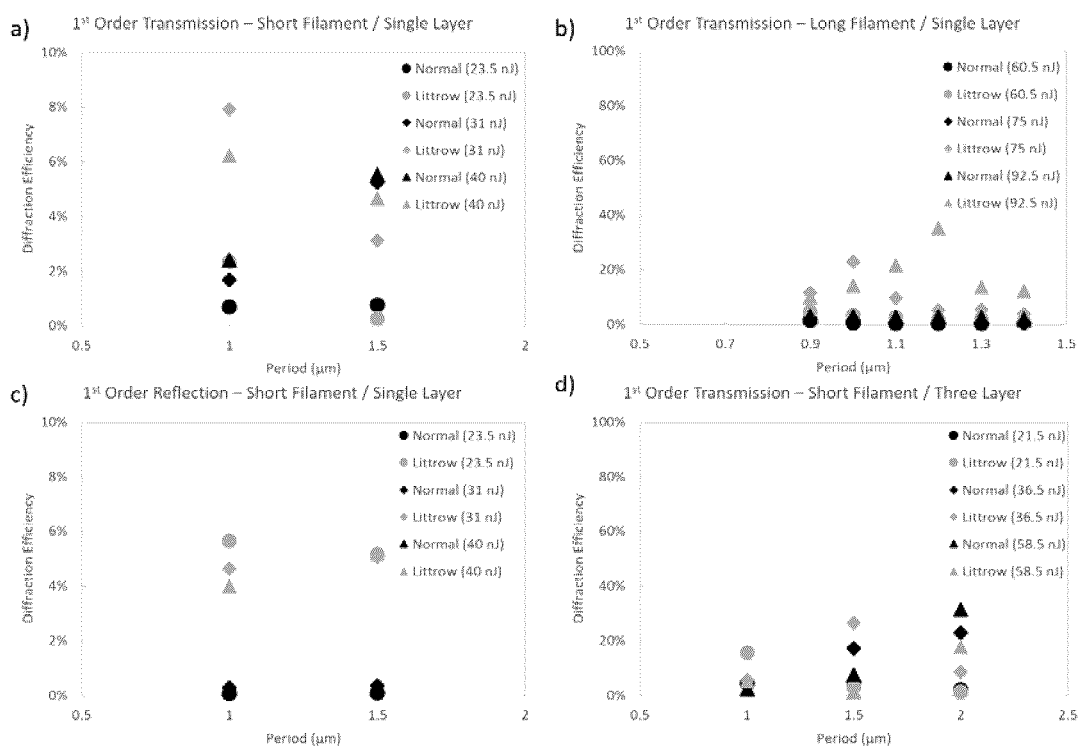

FIG. 18 illustrates the relative merits of short and long grating lengths, Littrow angle effects, and multi-layered Talbot resonances, showing plots of the combined $1^{st}$ order diffraction efficiency.

DEFINITIONS

Beam shaping: refers to any technique for changing a shape, focus, direction, or optical properties of a laser beam, as described herein.

Laser-modified track: refers in the context of the present application to any modification, abrogation, aberration, or generally elongate modified portion of or within a substrate such as a polymer substrate, that runs generally non-parallel with the surfaces of the substrate, formed by any method including but not limited to melting, sublimation, decomposition, deformation, or displacement of the substrate. Each laser-modified track may comprise any form of modified substrate, or region or elongate volume of modified substrate material, wherein the modification results in a different refractive index to the modified material of the substrate prior to its modification. Typically, such laser-modified tracks may be formed for example by laser pulses upon the substrate, where the shape and elongate direction of the laser-modified track generally conforms to or is consistent with the direction of the laser and its interaction with the material of the substrate, typically with the laser and the substrate stationary or not moving relative to one another, or moving very little relative to one another, during the duration of a laser pulse. Typically, in some embodiments, the elongate nature of the laser-modified track in the substrate is generated using a laser with beam-shaping of the laser light so that the incident laser light becomes focused in a distributed manner along a laser beam longitudinal axis that extends through the substrate sheet. In this way, the energy of the laser beam is not focused in a particular location or depth in the substrate, but instead the energy of the laser beam is distributed in a controlled manner along a line path extending within and optionally through the substrate generally coaxial with a direction of the laser. The laser beam may thus be caused to modify the document substrate along a defined one-dimensional section of its 'track' or beam path as the distributed focused portion of the laser interacts with and passes partially or entirely through the document substrate. In some embodiments the wavelength and pulse duration of the laser may be favourably selected to activate photothermal versus photochemical reactions at low energy exposure, or drive nano-explosion from a shaped absorption volume with higher laser pulse energy. In some embodiments the modification zone may be fully formed by a single laser pulse or a burst-train of pulses at high repetition rate (i.e. 10 kHz to 100 GHz), wherein the latter enables accumulative substrate effects over multiple pulses to result in favourable benefits such as from thermal cycling, large heat-affected zones, and defect generation in the material. In some embodiments, laser-modified tracks may comprise regions or portions of modified polymer where polymer chains of the polymer are caused to generally align with the direction of the laser, and optionally may additionally form voids or amorphous regions (typically elongate voids or elongate amorphous regions) within the substrate material. Laser-modified tracks may comprise a volume of modified substrate material that is 1-5000 nm in width, and 0.1-3000 µm in length. For example, laser-modified tracks may be "elongated" if they comprise a volume of modified substrate that is at least 4 times longer (typically in direction extending in line with the laser beam) than their individual width. Further, laser-modified tracks may extend perpendicular or non-perpendicular (but generally not parallel with) the substrate surface, or shaped to follow curved or helical path. Optionally, any laser-modified track may be further modified by chemical treatments, added layers, or thermal annealing as required according to any specific embodiment. In some embodiments, the term "laser-modified track" is used interchangeably with the term "filament".

Periodicity: refers to regular interval separation of laser-modified tracks of a substrate sheet, within a two-dimensional array of such tracks within the substrate sheet, or a portion thereof, as described herein. Typically, the term refers to the general or average, regular, ordered separation of the laser-modified tracks that have been modified post-production of the substrate sheet to exhibit a change of refractive index of the substrate sheet material, separated by unmodified areas or portions of the substrate sheet that retain their original refractive index from the original materials of, and original manufacture of, the substrate sheet. In some embodiments, a periodicity for a small area of a two-dimensional array of said laser-modified tracks may optionally or typically be at least substantially constant, but the periodicity for a larger area of the two-dimensional array of said tracks may optionally change within or across the array, or be different between adjacent arrays, according to the specific embodiment. Typical or average periodicity, in terms of average separation of laser-modified tracks and their constituent modified substrate material, within a two-dimensional array of laser-modified tracks, may for example comprise tracks that are separated from one another, or separated from a nearest adjacent track, by from 0.05-10 µm, more preferably 0.1-5 m, on average by unmodified material of the substrate sheet that retains its original general refractive index. For example, two-dimensional arrays may include periodicity intervals of separation between the regions of the array that may give rise to optical diffractive effects, or which may be too large or too small to give rise to observable optical diffractive effects, within the visible light spectrum. For example, without wishing to be bound by theory, regions that are separated from one another by 0.1-5 µm on average by the unmodified material of the substrate sheet may be preferred to give rise to observable optical diffractive effects within the visible light spectrum. Selected embodiments comprise random variation in periodicity, chirping of the spatial frequencies, superposition of gratings with different periods and/or shapes.

Polymer: refers to any polymer or polymer-like substance suitable to form a substrate material e.g. in the form of a sheet-like or roll-like configuration to be formed or cut into a size suitable for use as in security documents. The polymer may be a substantially uniform sheet of polymer material, or may take the form of a laminate structure with layers or polymer film adhered together for structural integrity, such as disclosed for example in international patent publication WO83/00659 published Mar. 3, 1983, which is incorporated herein by reference. Polymers may include but are not limited to polypropylene, PMMA, polycarbonate, polytetrafluoroethene (PTFE), PET, BOPP, BOPET, PEN, PP, PVDF and related co-polymers such PVDF-TrFE.

Region (of a substrate): refers to a part of a substrate that includes a specific or defined portion of the substrate that has a refractive index that differs from that of the remainder of the substrate due to substrate post-production modification. Such a region may comprise for example a laser-modified track as described herein, or any modified substrate, polymer, voids, abrogation, or anomaly that achieves the change in refractive index for the material of the region or a part thereof. In selected embodiments the net effect of the material modification is to redirect the propagation of light by optical means of Fresnel reflection, Rayleigh or Mie scattering, or induction of localized absorption zone. In selected embodiments the collective response of such optical effects from an array of similar modification zones is then aimed to spectrally filter and redirect light with controlled ranges of wavelength and diffraction angles.

Security document: refers to any polymer- and/or non-polymer-based document of importance or value. In selected embodiments, a security document may include features or devices intended to show that the document is a genuine, legitimate or authentic document, and not a non-genuine, illegitimate or counterfeit copy of such a document. For example, such security documents may include security features such as those disclosed herein. Such security documents may include, but are not limited to, identification documents such as passports, citizenship or residency documents, drivers' licenses, bank notes, cheques, credit cards, bank cards, and other documents of monetary value.

Security device or feature: refers to any device or feature that may be added to or incorporated into a security document for the purposes of making that security document more difficult to copy, replicate, or counterfeit, including structures or features incorporated into the substrate material or substrate sheet of the security document, or resulting from modification of the substrate material or substrate sheet. Substrate sheet/substrate material: refers to any material or combination of materials used to form the main structure or sheet of a security document. The material is typically formed into a sheet or planar member and may be composed of at least one substance selected from but not limited to paper, plastic, polymer, resin, fibrous material, metal, or the like or combinations thereof. The substrate sheet may comprise more than one material, layered, interwoven, or adhered together. The material may be smooth or textured, fibrous or of uniform consistency. Moreover, the material may be rigid or substantially rigid, or flexible, bendable or foldable as required by the security document. The core material may be treated or modified in any way in the production of the final security document. For example, the material may be printed on, coated, impregnated, or otherwise modified in any other way as described herein.

Talbot effect: in some embodiments refers to the preferential alignment or misalignment of grating planes on axial periodic spacing, c, that matches or mismatches, respectively, with the Talbot self-imaging distance in multibeam interference. The objective of matching and mismatching is to enhance or diminish, respectively, the diffraction efficiency, working with or against, respectively, with interference generated solely by the single grating layer. The combination of these effects from multilayered, three-dimensional volume gratings afford more degrees of freedom in controlling direction and spectral content of light flowing through the grating.

DETAILED DESCRIPTION OF SELECTED EMBODIMENTS

The present disclosure encompasses security devices or security features that, at least in selected embodiments, are incorporated directly into a substrate material or substrate sheet of a security document, or which result from modification of a substrate material or substrate sheet, rather than being applied to or adhered to a substrate material or substrate sheet of a security document. The incorporation of such security devices or features into or within the substrate sheet of the security document presents certain advantages, depending upon the embodiment, as herein described.

For example, by incorporation of the security device or feature into the substrate of the security document the problems associated with adhered or applied security devices may be substantially avoided. Incorporated or embedded security devices and features, which form an integral structural feature of the document substrate, cannot be removed from the substrate material either intentionally or unintentionally without disrupting the integrity of the substrate. Accordingly, such security devices and features are typically more robust and less susceptible to damage or wear during document use.

Selected embodiments provide security devices and features that are formed within a polymer substrate post-production of the polymer into a sheet material. In certain examples, a security substrate polymer is modified using a specifically adapted laser source with certain defined properties. In this way, it is possible to generate embedded or partially embedded, optically discernable security features within polymer sheets, with certain advantageous optical properties, which to date have been difficult to achieve. For example, by way of certain methods and security devices herein described, certain types of diffractive effects may be introduced into a security document substrate directly without necessarily involving or requiring the addition of other layers or additives. In some embodiments, the optical effects present advantages over those previously known in the art. Methods to produce such security devices and features are also disclosed, which in selected embodiments are suitable for large scale document manufacture suitable, for example, for bank note production.

Other embodiments, however, include modified sheets of material such as polymer sheets as described herein, that are themselves applied or adhered to a substrate of a security document or bank note.

Accordingly, selected embodiments provide a substrate sheet comprising a material having a general refractive index n, the substrate sheet containing at least one ordered two-dimensional array of discrete elongate volumes of substrate each comprising laser-modified material. For each two-dimensional array, the elongate volumes of modified substrate material, otherwise known as 'laser-modified tracks' in the substrate material, extend at least partially across a thickness of the substrate sheet, wherein the substrate material has been modified to have a refractive index that is different to the general refractive index n of the substrate sheet from which each laser-modified track originated. Further, for each two-dimensional ordered array, the laser-modified tracks collectively diffract light impinging upon the substrate sheet to form a shape or image that is observable in reflection and/or transmission to the naked eye, or with the assistance of a screening tool. Optionally the laser-modified tracks, and/or the laser propagation paths within the substrate to generate the laser-modified tracks, are linear, curved, helical, or may take other configurations and orientations with different resulting optical effects. The inventors have achieved striking optical features within documents substrate materials based on such document substrate modification. In some embodiments, the arrays may comprise longer laser-modification tracks that may optionally extend substantially across or entirely across a thickness of the substrate material, with significant $\Delta n$ values relative to other devices known in the art.

In particular, selected embodiments provide a substrate sheet comprising a material having a general refractive index n, the substrate sheet containing at least one ordered two-dimensional array of discrete laser-modified tracks in the material generated by a beam-shaped laser with incident laser light in a distributed manner along a laser beam longitudinal axis extending through the substrate sheet, or generated by a beam-shaped laser with laser light distributed along and/or about a laser propagation path within the substrate sheet, each laser-modified track comprising an elongate volume of the material preferably at least 4 times longer than its width extending at least partially across a thickness of the substrate sheet. Each laser-modified track comprises an elongate volume of a modified form of the substrate material, that has a refractive index that is different to the general refractive index n of the substrate sheet from which each laser-modified track originated from, and wherein for each two-dimensional ordered array the laser-modified tracks collectively diffract light impinging on the substrate sheet to form an observable shape, image, or region of colour for example in reflection and/or transmission. In some embodiments the laser light of the beam-shaped laser is focused within the substrate in the manners described herein.

Such laser-modified tracks, when ordered into an array in a substrate sheet, such as a polymer sheet, provide particularly advantageous results in terms of optical effects, and in certain embodiments allow for more complex and distinct optical features as explained herein. Elongation of focused laser light to form into a filament type of shape of focused laser light can be achieved in many different ways known in the art, and such embodiments are not limited in this regard. Various embodiments may employ any technique for beam-shaping or re-focusing of laser light, and any combination of those techniques, as required. For example, two classes of beam shaping methods can be defined around (1) external optical tools or effects that impose a shaping effect before the light reaches a focus in the material, and/or (2) material response effects such as non-linear optics that further distort the beam path when propagating in the material. A combination of such effects may also be employed in selected embodiments such that laser energy can be dissipated into a myriad of three-dimensional (3D) shapes that deviate far from the typical Gaussian-shaped focal volume.

Selected embodiments further allow the advantage of a single pulse laser exposure to modify an internal volume of substrate material wherein a traditional small laser focal spot is stretched along a preferred axis or axes. Within this shape, the light intensity distribution is controlled to an above threshold value of absorption such that a single laser pulse can induce a preferred elongated geometry of material modification, such as the filament shape to generate laser-modified tracks in the substrate as described herein.

For example, in the case of transparent substrates such as transparent polymer substrates, multiphoton absorption, avalanche ionization, above threshold absorption and other nonlinear optical processes may only begin absorbing the laser beam at sufficiently high intensity confined to near the focal volume. The resulting material modification can be readily manipulated to induce refractive index structures,[5] volume nano-gratings,[6-8] nano-voids,[9] elongated filaments,[10] and nano-channels[11] in reproducible ways.

Beginning with external optical tools, surface and lens aberration[1] is one example form of beam distortion that may typically stretch the focal volume longitudinally along the beam propagation direction. Aberration effects are especially pronounced with strongly focusing lenses that offer high numerical aperture to form highly converging beams. Aberration arises when a focusing laser beam enters the flat first surface of the target material, an effect called surface aberration. This effect leads to an elongation of the focus towards the source, that grows with increasing focusing depth in the material and increasing numerical aperture of the focusing beam. This effect can be separated from the target sample for external control and amplification by placing for example a flat optic in the beam path between the lens and the target material. In this way, the plate thickness and refractive index of the material are used to control the length of the track forming in the target material. For example, plates such as silica plates or those made from another material may be from 0.1 mm to 10 mm in thickness, preferably 0.5 mm, 1 mm, 1.5 mm, 2 mm, 2.5 mm, 3 mm, 3.5 mm, 4 mm, 4.5 mm or 5 mm in thickness.

In any spherical lens or combination of lenses, aberration is frequently tuned to a minimum level. Hence, aberration can be readily manipulated and amplified by mismatching optical materials, reversing optical surfaces, and other means that an optical designer normally avoids in trying to make a traditionally 'perfectly' focusing lens system.

Various forms of optics containing non-spherical refracting surfaces are also indicated for selected embodiments, that inhibit focusing of all light rays to a common focus. This includes the axicon, which creates a Bessel-like beam of first order-stretching the beam into a long filament like shape. Mistuning of compensation collar lenses, used in deep focusing[21], may be employed in selected embodiments.

In other embodiments, a spatial light modulator (SLMs)[20,22-24] provides a high resolution, two-dimensional patterning control of the phase front of the beam, which after passing a focusing lens will enable a wide tuning ability of beam shape. With appropriate alignment, the lens completes a Fourier transform of the electric field distribution from the SLM surface to near the focal plane of the lens, which is placed inside of the target sample. Similar effects can be obtained from a liquid crystal panel that attenuates the electric field to produce a high resolution, two-dimension light intensity pattern. Other optional active tools of beam shaping including MEMs mirrors, acousto-optical lenses, diffractive optics, holograms, phase-arrayed beam steering antennas, and flexible membrane mirrors, as non-limiting examples.

In other embodiments, material response effects can significantly redirect the laser beam path once propagating inside of the target sample. The accumulated absorption of laser light during the exposure can result in thermal gradients and physio-chemical modification that may lead to self-lensing or defocusing effects during the laser interaction. In the domain of ultrashort pulse lasers, a high intensity building in the focal volume can induce a wide range of nonlinear optical effects including: intensity clamping[2] that shifts the interaction zone backward with respect to the laser propagation direction, the Kerr[3] effect that draws the focal interaction volume forward, and plasma defocusing that diverges the beam outward. Under the right balance, Kerr effect can induce a stable self-focusing effect that causes or forms long high intensity 'filaments' to form in the material In further examples, spatio-temporal beam shaping may be employed to influence the form of the laser interaction volume, which entails both control of the pulse time and space dimensions at the focal volume. On a simple level, astigmatic beams are an option to form filaments with non-circular cross-section. To this end, cylindrical lenses,[25] slit apertures[26] or SLMs[21] are non-limiting examples of external beam shaping techniques to form filaments with elliptical or planar shapes. Beam shaping permits an accelerated beam[32] to afford the option of 3D shaping of curved filament shapes. Space-time beam properties can be manipulated further to diminish self-focusing effects[43] or induce pulse front tilt effects[44][45][46] that create asymmetry in the pulse arrival time and shape of the resulting filament. In some embodiments, a combination of external and internal beam shape manipulate is thus anticipated in favourably exerting control over the morphology and structural form of the laser modification volume.

Other selected embodiments may employ parallel processing, wherein a single laser pulse is divided and directed to multiple locations in the sample to form multiple points of modification, thus speeding fabrication rates. As an example, SLMs offer active control in creating multi-focal positions that can manipulated to new locations in real time[29,30]. Other forms of parallel processing anticipate dividing the beam with diffractive optics, lens arrays and other devices (as those discussed) and projecting an array of similar beams to multiple processing points in one exposure.

For example, laser scanning may in certain embodiments be combined with sample motion to permit high speed scanning of the beam across a more slowly moving sample. Such scanning is typically provided by galvanometer mirrors, rotating polygons, and acousto-optic scanners.

Exemplary laser sources suitable for use in the presently disclosed methods include, but are not limited to, high power fibre lasers, such as any of the following commercially available models (laser wavelength is 1030 nm): Amplitude Systemes Satsuma HPS: pulse duration 400 fs; power 50 W; pulse repetition rate 1 to 2 Hz; pulse energy 40 µJ; IPG photonics YLPF-10-500: pulse duration 500 fs; power 10 W; pulse repetition rate 1 MHz; pulse energy 10 µJ, Clark MXR Impulse: pulse duration 250 fs; power 20 W; pulse repetition rate 2 MHz; pulse energy 10 µJ. Another option would be to use a cavity based Yb laser oscillator/amplifier. Other commercially available models include but are not limited to the Spectra-Physics Spirit and the Light Conversion Pharos. In selected embodimnts, each of the laser-modified tracks is generated by a femtolaser, such as a femtolaser with a pulse duration in the range of 0.1 fs to 100 ps for each laser pulse, with beam-shaping of the femtolaser beam prior to or upon its interaction with the substrate.

For some embodiments, for each laser-modified track in the substrate material the elongate volume of modified substrate material is at least 5 times, or at least 10 times, preferably at least 15 times, more preferably at least 20 times, longer than its width. Optionally, for at least some of the laser-modified tracks the elongate volume of modified substrate material is within the substrate sheet. In other embodiments, for at least some of the laser-modified tracks the elongate volume of modified substrate material is exposed on at least one surface of the substrate sheet. In other embodiments, for at least some of the laser-modified tracks the elongate volume of modified material in the substrate sheet includes a void in the substrate sheet, formed post-production of the substrate sheet, by melting, displacement or decomposition of a portion of the material of the substrate sheet.

The substrate sheet may take any form, but in some embodiments may have an average thickness of 10-3000 µm, preferably of 50-150 µm. In selected embodiments the substrate sheet is a polymer sheet, and the each of the at least one ordered two-dimensional array of discrete laser-modified tracks comprises laser-modified tracks in the polymer, generated post-production of the polymer sheet. For example, the substrate sheet may comprise BOPP, BOPET, PEN, PP, PVDF or related co-polymers such as PVDF-FrE.

Further, the laser-modified tracks independently from one another may, in some embodiments, extend within the polymer sheet from 5% to 100% of the distance between opposite surfaces of the polymer sheet, and optionally extend into one or more additional layers if present adjacent the polymer sheet.

Certain embodiments are particularly suited to polymer sheets and document substrates, wherein the regions of the substrate comprise laser-modified tracks in the polymer, modified post-production of the polymer sheet. The production of the security features may be adapted to achieve different degrees of substrate modification, either in terms of the area or volume of the laser-modified tracks, the spacing of the laser-modified tracks within the two-dimensional laser-modified track array, or in terms of the depth, width, length or shape of the substrate that is modified by the laser to have a different refractive index relative to that of the original substrate material.

For example, for at least some of the laser-modified tracks the modified form of the substrate material may be embedded within the substrate sheet. In other examples, for at least some of the laser-modified tracks, the modified form of the substrate material may be exposed on at least one surface of the substrate sheet. A single two-dimensional array may, in certain embodiments, also may include laser-modified tracks that are different from one another in terms of their size, area, spacing, distance, depth, shape, length, or extent of modified substrate, and whether the laser-modified tracks extend only within the material, or extend all the way to one or both surfaces of the substrate material. In some embodiments, the security devices may comprise laser-modified tracks in the substrate material (e.g. polymer) in which the modified form of the substrate material in at least some of the laser-modified tracks in the substrate sheet contain a void within the substrate sheet, created post-production of the substrate sheet, by modifying, altering, melting, deforming, displacing or decomposing of a portion of the substrate material. Optionally, such voids may extend entirely within a width of the substrate sheet, or may extend to one or both surfaces of the substrate sheet. The voids may comprise air, gas, amorphous polymer or other materials and their presence may, in certain embodiments, contribute to the optical properties of the two-dimensional array.

The examples described below discuss specific experiments in which substrate sheets comprising polymer are subjected to exposure to pulses of laser radiation derived from lasers such as femto-lasers, in order to generate example modified substrate sheets or substrate sheets comprising 'laser-modified tracks' as disclosed herein. Scanning electron microscope micrographs of cross-sections through the treated substrate material indicate that the polymer is typically arranged in bundles of polymer chains which, prior to exposure to the laser radiation, are relatively disorganized or randomly organized within the substrate. However, exposure to the laser radiation with a focus extending in a linear direction causes the bundles of polymer chains to become organized in a more linear fashion within an elongate volume of polymer material about the laser beam, such that the polymer chains generally adopt a more extended configuration generally in line with the orientation of the received laser radiation or laser beam (see examples for more details).

Therefore, in selected embodiments of the substrate sheet, the polymer comprises polymer chains, wherein the modified form of the polymer for at least some laser-modified tracks of each two-dimensional array comprises polymer chains that are at least partially ordered or aligned relative to those of the polymer sheet outside said laser-modified tracks. Optionally, the nanostructure of the resulting polymer sheet may optionally include displaced polymer chains to create periodic voids in the two-dimensional array, such that the laser-modified tracks of the array (comprising modified polymer) comprise polymer chains and optionally voids generally extending non-parallel to the surfaces of the polymer sheet. In this way, each of the laser-modified tracks in the polymer sheet may be caused to have a different refractive index relative to the general refractive index n for the polymer sheet.

In this regard, the modified polymer chains that have been influenced by exposure of the polymer sheet to the laser radiation may be caused at least partially to extend generally non-parallel to the opposing surfaces of the polymer sheet, and optionally may be formed due to melting, displacement or decomposition of the polymer within the laser-modified tracks of the polymer sheet as a result of exposure of the polymer sheet to the pulses of laser radiation.

Alternatively, the modified polymer chains that have been structurally modified by exposure of the polymer sheet to the laser radiation may be caused at least partially to extend generally perpendicular to the opposing surfaces of the polymer sheet, and optionally may be formed or aligned due to melting, displacement or decomposition of the polymer within the regions of the polymer sheet as a result of exposure of the polymer sheet to the pulses of laser radiation. Typically, the inventors have observed that the polymer chains exposed to the laser radiation appear to become aligned with a general direction of the path of the laser beam within the polymer, or aligned with other anomalies within the polymer themselves formed in general alignment with the path of the laser beam within the polymer.

In any embodiments disclosed herein, at least some of the aforementioned polymer chains within the laser-modified tracks of the substrate sheet may optionally extend within the substrate sheet to one or both surfaces of the polymer sheet. Alternatively or additionally, at least some of the polymer chains within the laser-modified tracks of the substrate sheet may extend in an elongate fashion within the polymer of the polymer sheet, but may not necessarily extend all the way to the surfaces of the polymer sheet.

In still further embodiments, the laser-modified tracks in the substrate sheet that are modified to have different refractive indices relative to the unmodified substrate sheet may comprise amorphous regions and/or voids that themselves optionally extend to one or both surfaces of the substrate sheet. For example, in some embodiments the various laser-modified tracks may comprise voids that themselves comprise amorphous polymer, air, vacuum, polymer decomposition or oxidation products, glassy or amorphous carbon compounds. For example, such voids have been observed extending within the polymer substrate in general alignment with a path of the laser beam used to generate the tracks in the substrate. Some corresponding features of the polymer sheet in this regard are described in the examples with reference to scanning electron microscope (SEM) images.

Each of the laser-modified tracks comprising an elongate volume of modified substrate material may thus have one of several different types of substructure depending upon the power, pulse length, shape, focal point, beam-shaping, or modification of the laser pulse or the type of laser used to impinge upon the substrate sheet. The type and nature of the laser radiation may therefore be tuned to achieve particular nano-structural features within the polymer substrate material. For example, the degree of polymer laser-modified track re-arrangement, the size and length of polymer anomalies or voids formed within the polymer, and the depth or extent of such features within the polymer, may be tunable according to the type of substrate material, the type of laser used to create the modified regions and modification of the laser beam. Moreover, a single two-dimensional array may comprise modified laser-modified tracks in the substrate that have been modified in different ways by different forms or degrees of laser energy so that the optical effects observed are inconsistent or change in different portions of the two-dimensional array.

The substrate material or sheet may comprise any material suitable for modification by a laser to change its refractive index or diffractive properties in any way. For example, in terms of polymers, examples may include but are not limited to BOPP, PP, PET, PVDF, opaque or none opaque fluoropolymers, non-photo polymers, opaque or none opaque polymers film, opaque or none opaque inorganic and organic coatings etc.

The substrate sheets, in any of the embodiments herein disclosed, may have any thickness. However, more preferred are those having a general thickness suitable for security document preparation and use. For example, certain embodiments may have an average thickness of 5-3000 µm, 10-300 µm, or from 50-150 µm. Moreover, the two-dimensional array of laser-modified tracks in the substrate may take any configuration or have any dimensions. Typically, though not necessarily, the ordered array may include tracks of modified substrate arranged in rows and columns approximately equidistant from one another across the plane of the substrate sheet. Alternatively, the rows and columns may be staggered, or the laser-modified tracks may be formed in any other configuration suitable to cause diffractive image or shape, or otherwise an image or shape observable in reflection and/or transmission, formed by collective observation of the regions forming the two-dimensional array. The periodicity of the laser-modified tracks forming the two-dimensional array may also be varied or selected according to the desired optical effect.

Each of the laser-modified tracks in a two-dimensional array within the substrate sheet may comprise an elongate volume of laser-modified substrate material having any dimensions but in some embodiments the volume of laser-modified material may range from 1-5,000 nm in width each on average (when the substrate sheet is viewed from its broadest side), extending partially or entirely through the substrate sheet. Moreover, the width of each laser-modified track may be consistent through the substrate sheet, or may vary according to depth within the substrate sheet. Again, different optical effects are achievable by way of tuning the shape of the laser-modified tracks both in terms of their plan view, periodicity, orientation, or in terms of their three-dimensional shape within the substrate sheet.

In any two-dimensional ordered array of the laser-modified tracks, the tracks may be separated from one another by any distance, on the basis that they nonetheless achieve a collective diffractive effect when observed together. For example, the laser-modified tracks within an array may be separated from one another by a periodicity of from 0.1-5 µm on average by the unmodified material of the substrate sheet that retains its original post-manufacture general refractive index (e.g. sometimes referred to herein as a general refractive index n).

As discussed herein, each laser-modified track of the substrate sheet comprises an elongate volume of modified substrate material that has a refractive index that is modified compared to a general refractive index for the substrate sheet. Any method or system may be used to cause the substrate to have a modified refractive index in the defined regions. However, as disclosed, one way to cause the modification is by exposure of the substrate sheet to a laser, for example by directing a laser upon a surface of the substrate sheet or through the substrate sheet. A single laser may be used to generate all regions of modified refractive index within the substrate sheet, such that the sheet may be moved relative to the laser to achieve each of the regions of the two-dimensional array. Alternatively, a single laser beam may be split for example by a suitable filter to apply laser radiation to multiple locations on a substrate sheet simultaneously. Alternatively, multiple lasers may be employed simultaneously or sequentially to modify the substrate sheet. Short pulses of laser radiation may be suitable to achieve suitable modification of selected substrate sheets, such as may be provided, for example, by a femto-laser as described herein.

In any of the substrate sheets disclosed, the 'laser-modified tracks' (e.g. polymer laser-modified tracks) may independently from one another extend within the polymer sheet from 1% to 100%, preferably from 5% to 90% of the distance between opposite surfaces of the polymer sheet.

Further, in any of the substrate sheets disclosed, any voids present within the substrate sheet may independently from one another extend within the substrate sheet from 5% to 100% of the distance between opposite surfaces of the substrate sheet.

In further embodiments there is provided a use of any of the substrate sheets disclosed herein, or any substrate sheet modified by any of the methods disclosed herein, as a security feature of a security document.

In yet further embodiments there is provided a security document comprising, as a security feature, any of the substrate sheets as disclosed herein, or any substrate sheet modified by any of the methods disclosed herein.

In yet further embodiments there is provided a method for the manufacture of any of the substrate sheets disclosed herein, or any of the security documents disclosed herein, comprising the step of:

exposing a surface of a substrate sheet to a laser, such as a femtolaser, in a plurality of regions corresponding to a two-dimensional array of said regions, thereby to partially, temporarily melt, displace, decompose or otherwise modify at least a portion of the material within each of said regions, thereby to alter a refractive index of the material within each of said regions.

In selected embodiments, the laser beam is shaped or otherwise modified by any methods or means described herein or otherwise known in the art, in order to modify the laser beam focus. For example, such modification to the laser beam may, in selected embodiments, employ beam-shaping such that laser light incident upon the substrate is focused in a distributed manner along a laser beam longitudinal axis extending through the substrate sheet, thereby to generate laser-modified tracks in the substrate. In this way, preferably each laser-modified track may be generated by a single laser pulse without need to change a focus of the laser within the substrate, or the position of the substrate relative to the laser. Accordingly, such techniques substantially obviate any need to move the laser focus and/or the substrate relative to one another in order to achieve each elongate laser-modified track. The laser-modified tracks thus generated by the methods of the present invention may comprise an elongate volume of modified substrate material, with a tailored shape, orientation or configuration, generated by a single laser pulse by virtue of the linearly or shaped distributed focal energy of the single laser pulse within the substrate. This in itself presents significant advantages over certain laser-marking techniques of the prior art, which prior art methods typically required the substrate to intentionally move in its z-axis (closer to or away from the laser source) during exposure to the laser, relative to the laser focus, in order to generate laser markings with any degree of "depth".

Such methods as disclosed herein, which employ beam-shaping such that laser light incident upon the substrate is focused in a distributed manner along a laser beam longitudinal axis extending through the substrate sheet, also reduce the risk of manufacturing tolerances. Prior art techniques, which typically involve focused Gaussian laser beams and laser etching or marking, may be prone to manufacturing tolerances or unintentional jitter or motion in the substrate sheet during laser exposure, especially during a continuous manufacturing process, which in turn may lead to inaccurate laser marking or improper depth allocation to such laser marking. Selected methods as herein disclosed provide a more consistent and reliable means to generate laser markings with depth and more complex configurations, including laser markings that are highly elongate such as the laser-modified tracks described herein. By distributed focusing of laser energy in a desired, pre-selected configuration, by tailored modification of laser light prior to, upon and during interaction with the substrate, more elongate and complex laser-modified tracks and track configurations in the substrate may be achieved. This in turn enables greater flexibility and tunability of optical output characteristics for the devices.

As discussed herein, the disclosed security devices may be formed in some embodiments by exposure of a sheet of substrate material such as a polymer to pulses of laser radiation. For example, short pulsed lasers (aka ultrafast) with pulse duration in the range of 0.1 fs to 100 ps may, depending upon the laser, be particularly useful for generating appropriately high intensity radiation to form a modified regions or laser-modified tracks within the polymer in a laser-modified track shape with a high aspect ratio inside of a polymer sheet. Such pulses of laser radiation are typically focused by a lens, but a focal beam shape of the laser may be distorted and/or stretched by (1) nonlinear interaction (Kerr effect or self focus) and further elongation by substrate surface aberration when optionally passing the focusing beam first through a thick enough optical plate (e.g. 0.1-10 mm, preferably about 1 mm), with potential further surface aberration at the surface of the substrate. In any event, the depth and/or length of the resulting laser-modified track formed within the polymer substrate may be controlled by surface aberration (plate thickness and Numerical Aperture of focused beam), and pulse energy, amongst other factors. In this way, the depth, length and potentially shape of each laser-modified track may be fine-tuned to create different optical effects. Further optical effects may be achieved, as described, by adjusting the periodicity of the laser-modified tracks, and/or by the patterning and/or periodicity of the resulting laser-modified tracks, and/or the lattice geometry and rotation of the array.

The laser-modified tracks thus formed in the substrate may be in some embodiments effectively form elongated focal lines or volumes within the substrate resulting from only part of the laser beam focused at any longitudinal position, so there is aberrated focusing, concentrating light into a small spot diameter, but extended over lengths longer than the typical depth of focus or confocal beam parameter. Efficient propagation through transparent material may be achieved whereby a tight focus of the laser energy is produced by the lens, and elongated focus length produced in a controlled position within the substrate, with energy dissipated only when above a critical energy level, driven by nonlinear absorption in the high intensity portion of the laser beam.

Selected embodiments may also employ a laser beam with distribution of the laser light at more than one depth within the substrate sheet, such that laser-modified tracks are generated by the laser at two or more depths within the substrate. Such embodiments may be useful when generating multiple arrays of laser-modified tracks that overlap one another at different depths in the substrate, when the arrays in the substrate is viewed in plan form. Multiple 'overlapping' arrays of laser-modified tracks may further give rise to interference effects between the arrays, as described herein.

Different Optical Effects Achieved by Varying One or More of the Periodicity, Lattice Geometry, Angle of Rotation of the Array, Periodicity, Length, Depth, Rotation, and Angle of Laser-Modified Tracks of the Substrate Sheet The optical properties of each two-dimensional array of laser-modified tracks, or sections or portions of the two-dimensional array, may be modelled, selected or tuned to meet the specific requirements of the application. For example, different parts of the substrate may be modified in a different manner in different sections of the device to generate the modified regions. Selective laser focusing and shaping of the laser beam, including modification of the beam prior to interaction with the substrate material, may generate regions of modified refractive index having the following example variations, all of which are encompassed by selected embodiments as disclosed herein:

Different depths for laser-modified tracks extending within the substrate

Different widths for laser-modified tracks

Different lengths for laser-modified tracks extending within the substrate, and optionally to one or both substrate surfaces Different angles for laser-modified tracks extending within the substrate relative to perpendicular to the substrate surfaces Different periodicity of the laser-modified tracks within the two-dimensional array Different lattice geometry of the laser-modified tracks within the two-dimensional array e.g. rhombic lattice, square lattice, hexagonal lattice, rectangular lattice, and parallelogrammic lattice Angle of rotation of the array relative to adjacent arrays, or different angles of rotation of regions within one array.

Regular (e.g. elongate or cylindrical) or non-regular shaping of the laser-modified tracks of the substrate material within the substrate Such additional variations to the laser-modified tracks in the substrate sheet, and/or between the modified regions the substrate sheet permit adaptability and finer tuning of the optical properties of the substrate sheet, either for the entirety of each two-dimension array, or for sub-sets or specific sections of each two-dimensional array. For example, selected embodiments permit the generation of more complex images through two-dimensional arrays of regions as described herein, wherein the regions of the array are produced with different periodicities, spacing, depth, shape, lattice geometry, rotation angle of the array, length, angle, or other modifications that previously have been difficult or impossible to achieve. Accordingly, a single two-dimensional array may comprise a consistent set of laser-modified tracks, or the regions within the two-dimensional array may vary by one or more variable factors as listed above, across and within the two-dimensional array. In this manner, the optical properties of the two-dimensional array, and the optical diffractive output from the two-dimensional array, may vary across and within the same array. Therefore, the methods employed by the inventors to generate laser-modified tracks as described herein, may be adapted and tuned in terms of the laser focus, beam-shaping, and substrate interaction, to achieve a wide variety of optical effects.

Alternatively, a substrate sheet may comprise multiple two-dimensional arrays each with selected and tuned optical properties that differ relative to one another. Such multiple two-dimensional arrays may or may not be spaced from one another in a substrate sheet, and each may have individually tailored regions with for example selected periodicities for the regions within each array.

For example, selected embodiments include substrate sheets that comprise laser-modified tracks of two-dimensional ordered arrays that are separated from one another by a spacing of from 1 to 10000 µm, preferably 1-10 µm, more preferably 1-50 µm, on average by the material of the substrate sheet having a general refractive index n. However, the substrate sheet may alternatively comprise a two-dimensional ordered array in which different sections of the array each comprise some of said laser-modified tracks, but wherein the laser-modified tracks within one section have different relative periodicities compared to the laser-modified tracks of at least one other section of the substrate sheet, such that the optical diffractive outputs of the different sections (resulting from diffraction of incident light) differ from one another, even when the same or equivalent incident light simultaneously impinges upon the different sections of the two-dimensional array.

For example, in some specific embodiments a substrate sheet comprising a two-dimensional array of laser-modified tracks may comprise pixel-like areas of the substrate, each preferably from 1-10 000 µm across, more preferably from 5-100 µm across, wherein at least some of the pixel-like areas containing laser-modified tracks have different optical diffractive output properties compared to other pixel-like areas in the two-dimensional array. Each pixel-like area may be designed and manufactured to have tailored optical properties by virtue of the nature and construction of the two-dimensional array laser-modified tracks of modified substrate, that it contains, their periodicity and other aspects of the regions.

For example, certain embodiments provide a substrate sheet as described herein, wherein each pixel-like area of the substrate sheet comprises laser-modified tracks having the same or substantially the same periodicity within each pixel-like area, such that each pixel-like area provides a generally uniform optical diffractive output upon exposure to incident light [e.g. see FIG. 8 (a)].

In other embodiments each pixel-like area comprises multiple sub-pixels each of which comprises an ordered array of said laser-modified tracks having a substantially consistent periodicity within each sub-pixel. However, the periodicity of the laser-modified tracks within the sub-pixels of any given pixel-like area may be different from one another, such that the optical diffractive output of any given pixel-like area is defined by a combination of optical diffractive outputs for all subpixels of that particular pixel area. In this way, the optical properties of each pixel-like area, or a group of adjacent pixel-like areas, may be customized upon manufacture, and different pixel-like areas may be attributed different optical diffraction output properties by virtue of tailored laser-modified track periodicity, spacing, lattice geometry, depth, length, angle, etc. of modified substrate material within each pixel-like area of the two-dimensional array, and their sub-pixels. This in turn permits the creation of additive and subtractive colours which enables the generation of images that provide multi-coloured output at specific output angles when the device is exposed to incident light. For example, each pixel-like area may itself comprises sub-pixels that each provide a red, green and blue optical diffractive outputs at selected angles upon exposure to incident light (rather akin to the pixels of a television screen, but static in terms of their output). In this way, the relative intensities of the red, green and blue outputs from the subsections of each pixel-like area may determine the colour of the combined optical diffractive output for the pixel-like area, or a plurality of such pixel-like areas, at a given angle [e.g. see FIGS. 8c and 8d]. Pixel-like areas may be designed to include a stronger red output, for example, relative to blue and green, or may permit combining of the red, green or blue outputs to create colours such as magenta or white that might otherwise be more challenging to generate by way of uniform two-dimensional arrays with uniform periodicity.

In other embodiments the substrate sheet may comprise a two-dimensional array of regions wherein the regions have a change in periodicity across the substrate sheet between one section and another, thereby to provide a change in optical diffractive output properties across the device upon exposure to incident light. Such changes in periodicity may be graduated from one region to another, or more marked in terms of the changes in periodicity from one region of the two-dimensional array to another. Again, such changes of periodicity for the modified regions of the substrate may give rise to tailoring of diffractive optical outputs to generate complex colour images tailored to a specific design, pattern, or pictorial representation.

As described selected embodiments may comprise two-dimensional arrays of laser-modified tracks in the substrate, modified to have an altered refractive index relative to the unmodified substrate sheet, wherein at least some of the laser-modified tracks generated by exposure of the substrate sheet to laser radiation, wherein the laser-modified tracks extend within or at least partially through the substrate sheet. Such laser-modified tracks may extend within or at least partially through the substrate sheet substantially perpendicular to the surface of the substrate sheet. Alternatively, the laser-modified tracks may extend within or at least partially through the substrate sheet at one or more non-perpendicular angles relative to the surfaces of the substrate sheet, for example under circumstances where the laser beam is directed upon the surface of the substrate sheet at an angle relative to perpendicular.

In further embodiments, the substrate sheet may comprise a two-dimensional array of laser-modified tracks in which the modified form of the material extends at different depths within the substrate sheet for different regions within the ordered array of said laser-modified tracks. The combined optical properties of the laser-modified tracks within any particular two-dimensional array, or portion thereof, may in selected embodiments be dependent upon the depth of the modified form of the substrate relative either to one or both substrate surfaces, or relative to the overall thickness of the substrate. Therefore, depth selection for example from pre-determined depth focusing of a laser to generate such laser-modified tracks in the substrate, may be utilized to tune the diffractive optical properties of any modified region of the substrate, or any two-dimensional array of such laser-modified tracks.

In still further embodiments, the laser-modified tracks in the substrate (in terms of refractive index) are elongate regions of modified substrate extending within and generally across the substrate sheet, optionally to one or both surfaces of the substrate sheet, either perpendicular or non-perpendicular to the surfaces of the substrate sheet. The optical properties of the substrate sheet, and the optical diffractive properties of the laser-modified tracks, may be varied by selecting the length of the laser-modified tracks extending within the substrate sheet. For example, a single two-dimensional array of laser-modified tracks may include differences in some areas of the array compared to other areas of the array with respect to the length of the elongate volume of modified material of the laser-modified tracks in the substrate material. For example, laser focusing and modification prior to or upon the laser being directed upon the substrate sheet may determine the nature, shape and length of the substrate sheet modification. The laser-modified tracks thus produced may be modelled and tailored in terms of their optical diffractive properties according to desired diffractive optical output and colour output properties for a particular substrate sheet.

In further embodiments, a substrate sheet may comprise two or more ordered two-dimensional arrays of discrete laser modified tracks of the material, each with the same or different patterning, shape or optical diffractive output relative to one another. In such embodiments, two or more of the ordered two-dimensional arrays of discrete laser-modified tracks of the material may or may not at least partially overlap. In embodiments where the two-dimensional arrays do overlap, the observable or detectable optical diffractive output for such overlapping portions may comprise a combination of outputs from each of the overlapping ordered two-dimensional arrays. In other embodiments where two or more ordered two-dimensional arrays of discrete regions of the material are present and at least partially overlap, the optical diffractive output of one ordered two-dimensional array may be further diffracted and modified by another two-dimensional array prior to output from the device, when the substrate sheet is exposed to incident light.

Selected Embodiments Employ Littrow and Talbots Effect

In selected examples, more than one array of laser-modified tracks may exist in the same substrate at different overlapping depths within the substrate, such that the combined optical output observable from both arrays is combined in an additive and/or subtractive matter. For example, in further embodiments some of which employ multiple arrays of laser modified tracks, the interplay between the outputs from the overlapping arrays may be subject to Littrow or Talbot effects that can be fine-tuned depending upon the properties and dimensions of the two-dimensional arrays and the laser-modified tracks they contain, examples of which are provided herein.

Interference Effects Provided by Littrow Configuration

In a volume phase grating of short spacing and long length ($L_f$), a single grating layer of low refractive index contrast (see for example FIG. 9) may provide only a weak diffraction efficiency on all non-zero orders when illuminated at normal incidence ($\theta_{in}=0°$). Here, the diffracted light from a filament length on extending over half a wavelength will not radiate in constructive interference. In the specialized case of Littrow configuration [51], a phase matching effect causes all the diffracted light to interfere constructively, permitting the full depth of the grating volume to contribute to a potentially high diffraction efficiency.

For a periodic diffractive structure with refractive index contrast, $\Delta n$, and thickness of d, the accumulated phase shift modulation of $$\phi = \frac{2\pi(\Delta n)d}{\lambda} \tag{1}$$

will be imposed on the phase front for light emerging from the grating. Scaler electromagnetic theory requires probing wavelength, $\lambda$, to be much smaller than the grating period, i.e. $\Lambda \gg \lambda$. With a weak refractive index contrast, a peak diffraction efficiency of 4.4% is reached for 532 nm wavelength light when the grating thickness reaches only d=2.65 µm thickness for $1^{st}$ order diffraction, and efficiency oscillates from 0 to 4.4% with increasing thickness [52].

Under the Littrow illumination, these phase matching limits are removed for a single diffraction order at a specific incident angle given by $$2\Lambda \sin(\theta_L)=m\lambda \tag{2}$$

where $\Lambda$ is the period of the grating, $\theta_L$ is the Littrow angle which is the input incident angle $\theta_{in}$, m is the diffraction order, and $\lambda$ is the probing wavelength. A diffraction efficiency of 97% was reported for a small grating period Λ=0.6 µm at λ=633 nm wavelength in a silica-air transmission grating [51].

Talbot Effects

When a periodic object is illuminated with spatially coherent light, a series of self-images of the illuminated object due to Fresnel diffraction can be observed. This observation was first discovered by H. F. Talbot [53], and the self-imaging length is called the Talbot distance (c). Chanda and Herman [54] noted that the interference pattern generated by a phase mask of period Λ leads to the coherent combination of the diffraction orders on planes repeated with the Talbot distance, c. In reverse, when diffractive grating elements are layered on the Talbot spacing, the diffraction from each layer will combine coherently, greatly improving the otherwise weak diffractive efficiency when illuminating the grating at normal incidence [52]. Hence, a second factor in grating diffraction efficiency arises from the Talbot distance, which for the case of probing at normal incidence ($\Theta_{in}=0°$), is given by $$c = \frac{\lambda_n}{1-\sqrt{1-\left(\frac{\lambda_n}{\Lambda}\right)^2}}. \tag{3}$$

Here, Λ is the period of the grating, $\lambda_n=\lambda/n_r$ is the light wavelength inside a material with a refractive index of $n_r$.

In the case of probing a multi-layered grating with incident angles other than normal incidence, further insights can be drawn from understanding that the repeated grating layers with a period of Λ at a distance of Talbot length, c, is a grating that needs to satisfy the grating equation on each of the lateral ($\Lambda_x$) and vertical (c) periodicities. For a grating inside of medium with refractive index, n, the traditional grating equation provides the relationship between the incoming and outcoming beam directions according to order m and lateral period, $\Lambda_x$, according to (see new FIG. 1a):

$$\sin\theta_{IN} = \sin\theta_{OUT,m} + m\frac{\lambda_n}{\Lambda} \tag{4}$$

The influence of an orthogonal grating along z, with period c, satisfies a similar grating equation for the same input and output angles, but with an independent order of interference, m'.

$$\cos\theta_{IN} = \cos\theta_{OUT,m'} + m'\frac{\lambda_n}{c}. \tag{5}$$

For strong diffraction efficiency for weakly contrasting gratings, equations 4 and 5 must be satisfied simultaneously for the same angles and wavelength. In this case, a Talbot length, c, can be specified for a given wavelength and diffraction angle to provide a high diffraction efficiency in either of reflection or transmission modes. Correspondingly, the first order diffraction beams from each grating layer are interfering destructively for half-integer layer with separations of 3c/2, 5c/2, 7c/2 and etc., which can be forced on other wavelengths for the same viewing angle optimized for a first wavelength $\lambda_n$ in Eq. 4 and 5. In this way, a powerful coherent Talbot alignment effect enhances diffraction efficiency without the restriction of Littrow angles presented above. Moreover, the anti-resonance factors in Eq. 5 can sharpen the wavelength responses that are enhance. At a fixed Talbot length, this corresponds to generating a high diffraction efficiency in a narrowing restrictive viewing angle for a targeted wavelength or select wavelengths, thus offering spectral filtering options for better colour viewing control.

Selected embodiments therefore encompass any and all possible Littrow and/or Talbot effects generated by the interaction of outputs from a single or multiple arrays of laser-modified tracks in a substrate. Relative spacings between the laser modified tracks of adjacent arrays in the substrate, in terms of the relative lengths of the tracks extending thought the substrate, positioning of the tracks of one array relative to another, and the spacings of the arrays relative to one another across a thickness of the substrate, give rise to many optically relevant options in terms of optical output from the devices.

In further embodiments a substrate sheet may include one or more two-dimensional arrays of laser-modified tracks as described herein, wherein the arrays or portions thereof include regions that are "rotated" relative to one another about the general plane of the substrate. For example, some arrays may be manufactured or structured to cause diffraction of incident light with asymmetric diffractive emission at a specific angle and in a specific direction away from the substrate surface, such that the angle-dependent emission is visible by a user not only at certain angles, but also only at certain positions about the plane of the substrate. To this end, modified tracks arrays in the substrate may be "rotated" relative to one another upon manufacture such that the angle-dependent, and position-dependent, emission can be viewed for the different regions depending upon a user's line of sight, such that rotation of the substrate about its general plane whilst maintaining a constant angle of incidence for the user's line of sight relative to the plane of the substrate, results in observation of a changing diffractive emission for different regions of the substrate a the device is rotated about its general plane, for example by the user [e.g. see FIG. 8b].

In some embodiments any substrate sheet as described here may further comprise one or more additional layers that partially or entirely overlay at least a portion of at least one two-dimensional array of laser-modified tracks in the substrate. For example, such additional layers may comprise one or more reflective layers, refractive layers, diffractive filters, transmissive filters, optical interference layers or stacks, ink, protective layer, overcoat, adhesion promoter. In any such embodiments, the additional layer or layers may modify incident light that impinges upon the substrate sheet, and/or the optical diffractive output of the substrate sheet, prior to observation or detection by a user.

The following examples described selected embodiments relating to the substrate sheets disclosed herein, their production and use. These are provided for illustrative purposes only and are in no way intended to be limiting to the subject matter and scope of the invention, nor the appended claims.

EXAMPLES

The following examples employ a specific substrate type (biaxially-oriented polypropylene or BOPP) and a specific laser system in the form of a Yb-doped fiber femtosecond laser system (Amplitude Systemes, Satsuma) provided Gaussian-shaped pulses (beam quality: $M^2=1.14$) of 515 nm wavelength (frequency doubled or halved wavelength) with a pulse duration of ~215 fs. Such substrates and laser systems are merely exemplary, and the claimed embodiments are not limited in this regard. Other substrates and systems to generate the devices as discussed may be employed as required.

Preliminary investigations involved laser beam shaping to generate a single laser-modified track or aberration upon or within the substrate. An aspherical air-focusing lens of 0.55 NA (NewFocus, 5722-A-H) was used to focus the laser into the substrate. A near-uniform narrow laser-modified track beam shaped with high aspect ratio was generated through a combination of Kerr nonlinear and longitudinal aberration effects when the laser was focused through fused silica glass plate of 2-mm thickness, prior to striking the substrate. By controlling the pulse energy in the range of 93.5 nJ to ~8.0 µJ and the fused silica glass plate thickness from 250 µm to 2 mm, laser-modified tracks of varying lengths and widths were produced in biaxially-oriented polypropylene (BOPP). Single or multiple pulses may be applied to the same interaction zone, to accumulate a larger overall modification change. Multiple pulses can be applied while moving the sample with respect to the laser focal (or vice versa).

Example 1: 2-Dimensional Array of Laser-Modified Tracks in BOPP

Figure 1:
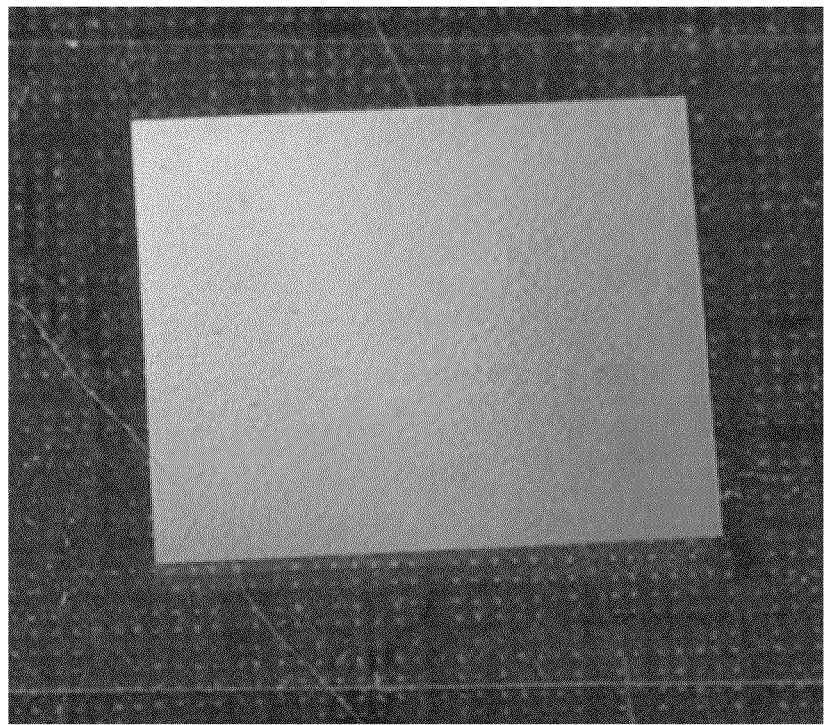
FIG. 1: An example optical image of a 2-D array of elongated 'laser-modified tracks' or modified regions embedded in BOPP, illuminated by a white light source and observed in reflection mode. Without the modified polymer structure or grating, the clear BOPP does not produce any substantial reflection, and does not disperse the wavelength spectrum as shown.

FIG. 1 is an example of a 2-D array of elongated laser-modified tracks to generate laser-modified tracks fabricated with a femtosecond laser at a wavelength and pulse energy of 515 nm and 243 nJ, respectively. The laser was focused with a 0.55 NA aspherical lens and focused first through a 2-mm thick fused silica to form a laser-modified track shape in the centre of the BOPP sample (i.e. 37.5 µm from the sample surface). The elongated laser focus formed laser-modified tracks of ~50 µm length and sub-micron diameter (resolution limit) according to optical microscopy. Each laser-modified track was formed within the BOPP with a single laser pulse, and formed into a 2D symmetric array with laser-modified track separation by a distance of $\Lambda_x = \Lambda_y = 3$ µm.

Under normal room lighting, the resulting 2-D array reflected and transmitted different colours (wavelengths) at different angles as shown in FIG. 1, with varying efficiency. By looking across the same, the eye observed different colours or effects at different angles of observation, which controlled the wavelengths that are most efficiency reflected by the embedded grating.

Figure 2:
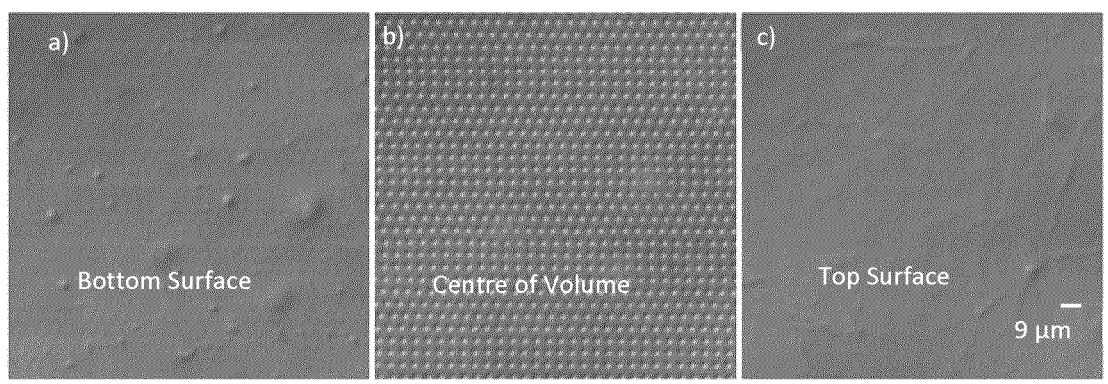
FIG. 2: Optical DIC microscope images showing the a) bottom surface, b) centre of volume, and c) the top surface of a 2-D array of elongated laser-modified tracks in BOPP.

FIG. 2 shows optical microscopy images taken with an inverted Differential Interference Contrast (DIC) microscope which enhances contrast of small changes in refractive index at nearby points: i.e. emphasizes the refractive index gradients.

Figure 3:
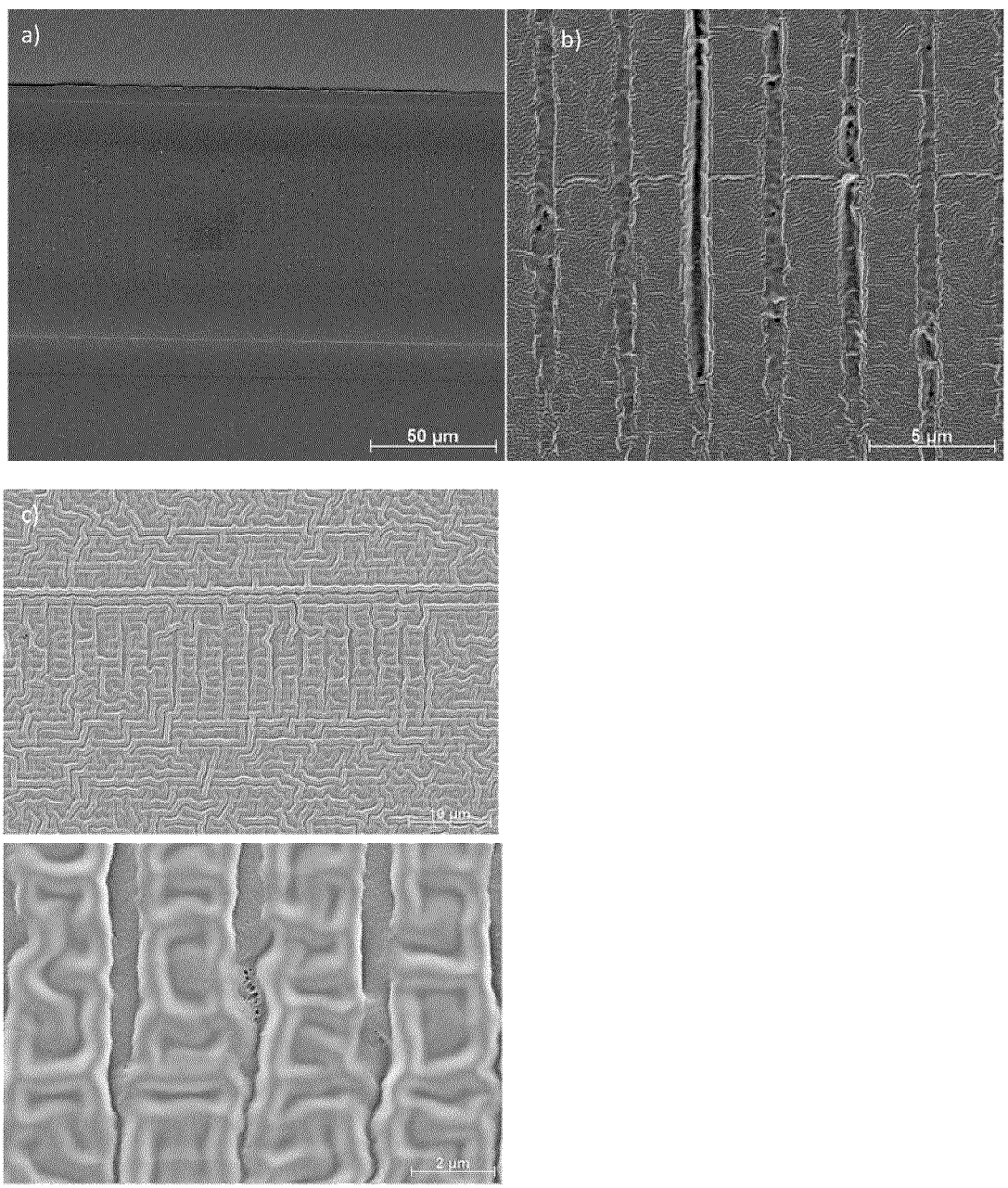
FIG. 3: Scanning electron microscope images showing the a) cross section of the BOPP film (~70-μm thickness) embedded with elongated laser-modified tracks of ~50-μm length and $\Lambda_x$=3-μm period, which do not extend to the top or bottom surface; b) the magnified cross sectional image showing laser-modified tracks that include long cylindrical nano-cavities of ~800-nm diameter by ~50-μm length, c)

The top and bottom surfaces of the BOPP substrate were unaffected by the laser irradiation as shown in FIG. 2, and the embedded elongated laser-modified tracks were formed only within the volume of the BOPP. FIG. 3 shows the scanning electron microscope (SEM) images of the embedded laser-modified tracks in BOPP, with each laser-modified track formed by a single laser pulse energy of 284 nJ.

The cross section SEM images shown in FIG. 3 confirm the laser-modified tracks were embedded inside the BOPP film without disrupting the top or bottom surfaces, as well as the near radial zone surrounding the laser-modified track, which was not directly laser radiated with high intensity; there was no apparent large reaching heat affected zone. At the irradiated sites, the elongated laser focal volume produced a long open cavity with an inner surface that may have melted with a length and width of ~50 µm and ~800 nm, respectively. The polymer chains immediately surrounding the laser-modified tracks were realigned by the laser to line up parallel along the direction of the laser-modified track. For BOPP, the alignment of unmodified zones placed the chains in lateral directions. This should affect the Raman signal, and optical birefringence of the laser-modified track structured zone. At the pulse energy of 284 nJ, a continuously opened void along the laser-modified track was also formed as shown in FIG. 3b. This may contain gases decomposed from the polymer by the laser, or air by diffusion after the laser process. The diameter and length of laser-modified track cavity are controllable.

Example 2: Large Area 2-Dimensional Arrays of Laser-Modified Tracks in BOPP and PET A BOPP sample was fabricated with the same technique as mentioned in Example 1. FIG. 4 is an example of 2-D arrays of laser-modified tracks with each laser-modified track fabricated with a single pulse of 210-nJ energy and varying periods of 1 µm, 1.5 µm, 2 µm, 2.5 µm, 3 µm, 3.5 µm, 4 µm, 4.5 µm and 5 µm, as labelled. Varying the period of the 2-D array of gratings tunes the wavelength response of light diffraction that is being strongly reflected and transmitted at a given angle. As shown in FIG. 4a and FIG. 4b, capturing the image with a camera equipped with a white LED irradiated at a slight angle from the left side (left-right tilt) and at normal incidence with a slight pitch (up and down tilt), respectively, provides a vibrant array of different reflected colours controlled by grating period, by viewing angles that are polar and azimuth.

FIG. 14 shows photos recorded from single layer of symmetric 2-D array of short laser-modified tracks in BOPP generated with a femtosecond laser at a wavelength of 515 nm and pulse energies ranging from 17.5 nJ to 142.0 nJ (from the top row to the bottom) as indicated on the right side of the figure. The laser exposure was focused directly into the polymer sample without inducing aberration by a glass plate, resulting in filament length, $L_f$, shorter than 10 µm. The laser was focused with a 0.55 NA aspherical lens to form a laser modification track shape in a 2-D array of a single layer positioned in the centre of the BOPP sample (i.e. 37.5 µm from the sample surface) with the transverse period $(\Lambda = \Lambda_x, \Lambda_y)$ varied of 0.5 µm to 1.5 µm with increment of 0.1 µm from the left column to the right as indicated in the figure. All four images were recorded from the same sample, with varying incident angle while irradiated with a fixed incandescent light and camera angle in reflection mode (a-b) and transmission mode (c-d). The angles of the light source and camera with respect to the normal of the sample surface were small (a and c) and large (b and d).

With exposure at a low pulse energy of 17.5 nJ, the polymer appears to be transparent when irradiated and viewed at shallow angle in (c), wherein diffraction does not satisfy the grating formula (i.e. Eq. 2 or 4). The same grating area diffracts a bright red colour when aligned under a steep irradiation incident angle in (d), satisfying the grating equations. This lower pulse energy exposure thus permits formation of isolated filament structures, forming high resolution grating arrays having high diffraction period to a least the period of 0.6 µm. Lower energy exposure is expected to enable formation of diffraction gratings with smaller period, $\Lambda$, by avoiding material damage and washing out of the refractive index contrast in the polymer sample.

The diffuse white colour observed from grating zones in the lower left corner of the polymer sample arises from optical scattering as the modification zone has been damaged and thermally charred by a combination of higher pulse energies and smaller periods. In the non-damaged zone with low pulse energy exposure, brilliant diffraction colours are observed changing over increasing period (right to left) as follows:

reflection at small angle (a): orange ($\Lambda$=1.5 μm), green ($\Lambda$=1.4 μm), indigo ($\Lambda$=1.3 μm), light blue ($\Lambda$=1.2 μm), deep blue ($\Lambda$=1.1 μm), purple ($\Lambda$=1.0 μm), reflection at large angle (b): red ($\Lambda$=1.5 μm), orange ($\Lambda$=1.4 μm), light orange ($\Lambda$=1.3 μm), yellow ($\Lambda$=1.2 μm), green ($\Lambda$=1.1 μm), light blue ($\Lambda$=1.0 μm), deep blue ($\Lambda$=0.9 μm), purple ($\Lambda$=0.8 μm), transmission at small angle (c): deep red ($\Lambda$=1.5 μm), bright red ($\Lambda$=1.4 μm), orange ($\Lambda$=1.3 μm), yellow ($\Lambda$=1.2 μm), yellowish green ($\Lambda$=1.1 μm), green ($\Lambda$=1.0 μm), dark green ($\Lambda$=0.9 μm), deep blue ($\Lambda$=0.8 μm), purple ($\Lambda$=0.7 μm), and transmission at large angle (d): green ($\Lambda$=1.5 μm), light blue ($\Lambda$=1.4 μm), purple ($\Lambda$=1.3 μm), reddish purple ($\Lambda$=1.2 μm), yellow ($\Lambda$=1.1 μm), light green ($\Lambda$=1.0 μm), dark green ($\Lambda$=0.9 μm), reddish purple ($\Lambda$=0.8 μm), light orange purple ($\Lambda$=0.7 μm), bright red ($\Lambda$=0.6 μm).

FIG. 15 shows photos recorded from single layer of symmetric 2-D array of long laser modified tracks in BOPP generated with a femtosecond laser at a wavelength of 515 nm and pulse energies ranging from 79.0 nJ to 141.0 nJ (from the top row to the bottom) as indicated on the right side of the figure. The laser exposure was focused through a 2-mm thick fused silica plate and into the polymer sample, inducing aberration to elongate the laser-modified track length to more than 10 μm. The laser was focused with a 0.55 NA aspherical lens to form a laser modification track shape with a layer of 2-D array of laser tracks in the centre of the BOPP sample (i.e. 37.5 μm from the sample surface) with the transverse period ($\Lambda$=$\Lambda_x$, $\Lambda_y$) of 0.9 μm to 1.4 μm with increment of 0.1 μm from the left column to the right as indicated in the figure. All four images were recorded from the same sample, with varying incident angle while irradiated with a fixed incandescent light and camera angle in reflection mode (a-b) and transmission mode (c-d). The angles of the light source and camera with respect to the normal of the sample surface were small (a and c) and large (b and d).

The brilliant diffraction colours are observed changing over increasing period (right to left) as follows:

reflection at small angle (a): faint purple ($\Lambda$=1.4 μm), very faint red ($\Lambda$=1.3 μm), faint red ($\Lambda$=1.2 μm), red ($\Lambda$=1.1 μm), green ($\Lambda$=1.0 μm), blue ($\Lambda$=0.9 μm), reflection at large angle (b): orange ($\Lambda$=1.4 μm), yellowish green ($\Lambda$=1.3 μm), green ($\Lambda$=1.2 μm), light blue ($\Lambda$=1.1 μm), blue ($\Lambda$=1.0 μm), purple ($\Lambda$=0.9 μm), transmission at small angle (c): faint light blue ($\Lambda$=1.4 μm), faint purple ($\Lambda$=1.3 μm), very faint red ($\Lambda$=1.2 μm), red ($\Lambda$=1.1 μm), green ($\Lambda$=1.0 μm), blue ($\Lambda$=0.9 μm), and transmission at large angle (d): red ($\Lambda$=1.4 μm), yellow ($\Lambda$=1.3 μm), light green ($\Lambda$=1.2 μm), light blue ($\Lambda$=1.1 μm), purple ($\Lambda$=1.0 μm), very faint purple ($\Lambda$=0.9 μm)

FIG. 12 shows camera images of light reflections from fluorescent lamps made by 70-μm thick polyethylene terephthalate (PET) film, observed at varying tilting angles of the sample with respect to fixed camera and light source positions. The PET film was embedded with a series of symmetric 2-D arrays of filament tracks (rectangular zones stacked vertically), formed by a femtosecond laser at pulse energies of 104.0 to 1005.0 nJ, and periods of 1.0, 1.5, and 2.0 μm. The filament tracks were elongated by aberration, pre-focusing through 2 mm thick silica plates. With the lower pulse energies of 150.5 nJ and 325.5 nJ, brilliant colours from grating diffraction can be observed at $\Lambda$=1.5 μm and 2.0 μm periodicity. For $\Lambda$=1.5 μm, the colours observed are a) green and cyan, c) purple and cyan, d) cyan with a hint of blue, and e) cyan. For $\Lambda$=2.0 μm, the prominent colours are b) purple to cyan, c) cyan to yellow, d) yellow-orange to red, and e) red. At a high pulse energy of 1005.0 nJ, the charring of the PET film created a grey-coloured metallic reflection effect at all periodicities. With a moderately high pulse energy of 325.5 nJ, the small period of $\Lambda$=1.0 μm also resulted in a charring effect due to the closer filament density spacing, creating a similar metallic-like reflection.

Example 3: Scanning Electron Microscopy of 2-Dimensional Arrays of Laser-Modified Tracks in BOPP A sample was fabricated with the same technique as mentioned in Example 1. FIG. 5 shows cross-section SEM images of embedded elongated laser-modified tracks fabricated with a period of 2 μm and decreasing pulses energies of a) 1004 nJ, b) 525 nJ, and c) 284 nJ. By controlling the laser pulse energy, the elongated laser-modified track lengths can be easily tuned to the desired length. As shown in FIG. 4, laser pulse energies of 1004 nJ (FIG. 4a), 525 nJ (FIG. 4b), and 284 nJ (FIG. 4c) produced elongated laser-modified tracks with lengths of ~50 μm, ~43 μm, and ~36 μm, respectively.

Another method of controlling the laser-modified track length is to vary the thickness of the fused silica plate, which affects the spherical aberration when the laser is being focused through the plate. The thicker the fused silica plate, the more spherical aberration is introduced in focusing the laser beam, which in turn provides a more elongated laser-modified track. FIG. 6a shows cross-section SEM images of a 2D array of ~50-μm long laser-modified tracks embedded in ~70-μm thick BOPP with a pulse energy of 284 nJ was focused through a 2-mm thick fused silica plate. In contrast, FIG. 6b shows a much shorter laser-modified track of ~7-μm in length when fabricated with a pulse energy of 65 nJ and with the absence of fused silica plate.

The position of the laser-modified tracks inside the substrate can be controlled by changing the focusing position. Depending on the application, laser-modified tracks can be completely embedded or partially embedded in the substrate.

FIG. 7a shows the optical microscope image of the bottom surface of a 2D array of partially embedded elongated laser-modified tracks fabricated with the same technique used in Example 1, but focused ~15 μm below the centre of BOPP film and a pulse energy of 1004 nJ. The ablation debris at the bottom surface is an indication of an open laser-modified track. FIG. 7b shows the cross-section SEM image of the bottom half of the substrate where the elongated laser-modified tracks penetrated through the bottom surface. FIG. 7c shows the cross-section SEM image of the top half of the substrate where the track is still embedded inside and not breaking the top surface of the substrate. By controlling the laser-modified track length through the use of spherical aberration and/or varying the laser pulse energy together with controlling the laser focusing position, different structural and optical requirements can be met on different substrates.

Example 4—Schematic Example of 2-Dimensional Arrays of Laser-Modified Tracks Arranged in Pixel-Like Areas to Generate an Image FIG. 8 illustrates how a more complex multi-coloured image, such as the Canadian flag, maybe formed from a series of pixels each containing a series of sub-pixels made up of laser-modified track arrays with the array spacing required to generate red, green or blue diffractive light output. The orientation of the pixel arrays can also be rotated with respect to the horizontal axis to further modify the observed colour and/or intensity of the diffracted light output form the array.

FIG. 8a illustrates schematically the formation of diffractive red stripes in the Canadian flag using array of laser modified tracks with a given track periodicity and array periodicity in the x and y directions. FIG. 8b illustrates schematically how a laser-modified track array can optionally be rotated at any angle with respect to the horizontal image plane to modify the observed diffractive light output from the array. FIG. 8c illustrates schematically the formation of the white area within the Canadian flag by a series pixel arrays containing red, green and blue subpixels arrays with each subpixel array containing the needed track periodicity to generate red, green or blue diffracted light output for each subpixel. The output of the pixel is a sum of the RGB subpixel diffractive output. FIG. 8d illustrates schematically an alternative pixel design consisting of hexagonal shaped subpixel arrays that can generate the combined RGB diffractive light output for the white portion of the Canadian flag. The pixels' array periodicity and distance are identified in the illustration.

Example 5: Simulation (FDTD) of Diffraction Efficiency Illustrating Talbot and 3D Photonic Crystal Effects In the following examples, the flexible point-by-point writing of laser-modified tracks into 2D and 3D grids of periodic refractive index modulation is explored by finite difference time domain (FDTD) simulation (Lumerical software) to demonstrate the spectral filtering options anticipated by the present invention. As noted in the SEM images of FIG. 13, two zones of laser modification are expected in BOPP filament structure to provide relatively low refractive index contrast (i.e. Δn ~0.01) for low pulse energy exposure or high refractive index contrast (i.e. Δn ~0.5) for high pulse energy exposure. More generally, similar difference in generating low and high refractive index contrast are anticipated for other optical materials, wherein control of laser pulse exposure is set respectively below or above a threshold for opening of elongated voids.

The arrangement of the laser-modified tracks into different crystallographic planes or aperiodic structure is well known in the field of photonic crystals to offer control over forming photonic stop bands at particular angles of propagation and particular spectral bands, or in enhancing diffraction efficiency into particular angles of propagation and particular spectral bands. In this way, the present invention anticipates the variation of the structural geometry and crystallographic arrangement of the laser-modified tracks in areal zones changing across the transparent film in order to control the diffraction of light, zone by zone, and cast light that is spectrally and/or angularly enhanced or filtered to render formation of vividly coloured images under specific illumination conditions. Examples of the underlying control for such spectral and angular filtering are presented for the cases of both high ($\Delta n=0.46$) and low ($\Delta n=0.033$) refractive index contrast in FIGS. 16 and 17, respectively. Light was launched as a plane wave front, with wavelengths spanning from 380 nm to 700 nm, and presented at an incident angle of $\theta_{in}=0°$ to the grating plane (i.e. normal incidence in FIG. 9a). The percent efficiency of power launched into all permitted interference modes, both in transmission and reflection, were calculated as a function of wavelength. The spectral recordings may also present an angular distribution of the light with wavelength, with the wavelength scale converted into diffraction angle, $\theta_{out}$, calculated by Eq. 4 for either forward or reflected directions (FIG. 9) and for either x-axis and y-axis deflections. For normal incidence, four beams of $1^{st}$ order interference result for both transmission and reflection, with orders $(m_x, m_y) = (+1,0), (-1,0), (0,+1)$, and $(0,-1)$. The sum of all fourth order diffraction efficiency are presented in the simulated FDTD spectra for this case of $1^{st}$ order diffraction. The two curves in each graph represent the total transmitted or reflected light (purple or highest valued line) and the subcomponent of this light that was diffracted into either the $0^{th}$ or $1^{st}$ order diffraction directions (green or lowest valued line).

FIG. 16 plots the diffraction efficiency expected by FDTD simulation from periodic arrays of filaments that have been opened into voids, providing a high refractive index contrast of $\Delta n=0.46$. Each filament was cylindrically shaped, with a diameter of 0.8 μm and a length of 1.5 μm, and arranged in a square patterned 2-D array (i.e. $\Delta x_{a,b}=\Delta y_{c,d}=0$ in FIG. 9c) with symmetric lateral periods of $\Lambda=\Lambda_x=\Lambda_y=1.0$ am. The areal duty cycle of open and closed zones in the grating layer was nearly 50:50, to offer the most efficient diffraction efficiency into higher orders (i.e. m=1 or higher).

FIG. 16s (a), (c) and (e) plot the $0^{th}$ and $1^{st}$ order transmission spectra, and the $1^{st}$ order reflection spectra, respectively, calculated for the single layer grating array. With such high contrast, the 1.5 μm filament length resulted in a 3π phase contrast for 460 nm light, corresponding to destructive interference of this green light at the centre of the visible spectrum. One notes strong rejection of the $0^{th}$ order transmission to ~5% (FIG. 16a) and a correspondingly strong total diffraction efficiency of ~80% in the combined $1^{st}$ order diffracted beams in transmission (FIG. 16c) that is enabled by this high refractive index contrast when using such a thin grating zone. The single layer grating further presents a broadband filter, strongly rejecting $0^{th}$ order transmission in the blue-green spectral band (FIG. 16a), and redirecting this light into four beams in $1^{st}$ order transmission. The single layer grating structure provides only a modest reflection, peaking at ~2% into reflected $1^{st}$ order beams (FIG. 16e). The reflection resonances arise from a thin-film effect by the 1.5 μm thick grating layer, yielding a free spectral range of ~460 nm wavelength. Including multi-orders, the total reflection on all orders reaches only a maximum of 5% at 432 nm. Hence, most of the incident light in the visible spectrum is directed into the $1^{st}$ order beams (FIG. 16a).

FIGS. 16(b), (d) and (f) consider the further influence of multi-layered, 3D gratings wherein the same design of 2-D grating array above was replicated and spaced optimally for probing green light (520 nm wavelength) on Talbot planes separated by c=5.59 μm (Eq. 5). The laser-modified tracks from layer to layer were aligned axially (i.e. $\Delta x_{1,2}=\Delta y_{1,2}=0$ for layer 1 and 2, etc.), forming a tetragonal crystal arrangement of filaments. With the addition of 2 more layers, having a total of 3 layers, one notes the sharpening of the spectral features, broadening and flattening the destructive interference resonance in the $0^{th}$ order transmission (FIG. 16(b))

across a wide blue-green band (425 to 530 nm) while passing the red band of wavelengths (0.630±50 nm) that fall out of resonance with the Talbot condition in Eq. 5. The $1^{st}$ order diffraction spectrum (FIG. 16(d)) is no longer a well matched complement to the $0^{th}$ order diffraction as in the single layer case (FIG. 16(a and c)), as more diffracted light (~10% in 3 layers versus ~3% in single layer) is now coherently interfering in the reflection direction due to the Talbot enhancement effect.

FIG. 16(f) demonstrates the strong enhancement of grating reflection due to the Talbot and other resonance effects, giving rise to multi-wavelength peaks appearing across the visible spectrum that reach above 20% efficiency for the combined $1^{st}$ order beams. This is 10-fold stronger than the single layer case, thus demonstrating the strong potential for managing the visual colour of transparent films by spectral and angular filtering as demonstrated in FIG. 16 for the case of strongly contrasting 2D and 3D grating patterns.

FIG. 17 presents the transmission spectra generated from single (a) and seven layered (b-f) filament arrays based on filaments forming in BOPP (n=~1.5) and having a low refractive index contrast of $\Delta n=0.033020$. Each grating layer is built with cylindrical filament shapes of 0.518 μm diameter and $L_f$=1.12485 μm length, patterned on a two-dimensional symmetric grid with periodic basis of $\Lambda=\Lambda_x=\Lambda_y=0.65$ μm and having no lateral offsetting between the columns and rows of laser-modified tracks (i.e. $\Delta x_{a,b}=\Delta y_{c,d}=0$ in FIG. 9c). In a single grating layer, a small phase contrast of only $\phi=~0.14\pi$ (Eq. 1) has been accumulated for light when passing the grating at a central wavelength of 520 nm. The result is weak diffraction efficiency that extends fully across the full visible spectrum, as shown in FIG. 17a for the case of 1st order diffraction in the forward direction. This diffraction varies monotonically from ~3% to <1% efficiency for blue to red wavelengths. A majority of the light remains undeflected, exceeding >97% transmittance in $0^{th}$ order beam.

Increasing the grating length in a single layer does not significantly improve on the diffraction efficiency, except where the weakly contrasting laser-modified tracks have been segmented and aligned on Talbot planes. In the latter case, with seven grating layers having filaments positioned in tetragonal symmetry, and aligned axially row to row (i.e. $\Delta x_{1,2}=\Delta y_{1,2}=0$ in FIG. 9c), one finds a moderately strong stop band (47% attenuation) forming in a narrow spectrum (~40 nm bandwidth) centered near the design resonance of 520 nm (Eq. 3) as shown in FIG. 17(b). Most of the visible spectrum is transmitted undeflected, except for the narrow band of greenish coloured light that is ~47% redirected into 4 beams appearing in transmitted $1^{st}$ orders as plotted in FIG. 17c. This central wavelength light diffracts at an angle of $\theta_{out,m=1}$=~20°, or ~31° externally in air. Given the ~40 nm bandwidth of this stopband, the 7 layered grating will only pass a narrow band of light, from ~480 to 535 nm (3 dB bandwidth), to diffraction angles ranging from ~19 to ~21 degrees. This 3D grating leaves the viewing area significantly darkened at all other viewing angles, except for the 0th order transmission, where the complementary coloured light will appear, making possible the design of spectral and angular filters.

The spectral and angular filtering as presented in $1^{st}$ order transmission for the 7-layered tetragonal structure in FIG. 17 (c) can be further tuned by shifting or tilting of the filament grid, for example, by selecting non-zero values for any of the row ($\Delta x_{a,b}$) or column ($\Delta y_{c,d}$) transverse offsets or the row ($\Delta x_{1,2}$) or column ($\Delta y_{1,2}$) axial offsets (see FIG. 9c). A lateral half-period sift of filaments along the x-direction, applied between adjacent layers ($\Delta x_{a,b}=\Lambda_x/2=325$ nm), leads to a weakening of the central stop band, resulting in a drop of $1^{st}$ order transmission from 45% in FIG. 17(c) (tetragonal) to 30% in FIG. 17(d) (tilted tetragonal).

Other crystal structures may be considered in the design of laser-modified track patterns. Insertion of additional filaments into the present tetragonal design (FIG. 17c) leads to body centred cubic (bbc) or face centered cubic (fcc) arrangements, except with symmetry broken axially by Talbot periodicity exceeding the lateral periodicity (i.e. $c>\Lambda_x$). The result of such changes in crystal symmetry are a broadening of the stop band to 100 nm, as shown in $1^{st}$ order transmission for the stretched bcc symmetry in FIG. 17(e). A weakening of the stop band to a ~12% for $1^{st}$ order transmission is noted together with a ~30 nm blue-shift in the resonance peak wavelength as shown in FIG. 17(f) for the case of stretched fcc symmetry.

Example 6: Example Talbot Effects

FIG. 9 schematically illustrates various arrangements of laser-modified tracks in two-dimensional periodic grids in cross-section view (a-c) and top view (d-f). In FIG. 9a), a single layer of identical filament tracks of length, $L_f$, are spaced uniformly on period $\Lambda_x$. $L_f$ may be controlled by the laser pulse energy and the focusing conditions. An incident laser beam enters the grating layer at angle of $\theta_{in}$, leading to diffraction of transmitted and reflected beams at an output angle, $\theta_{out,m}$, that varies with diffraction orders, shown here for m=0 and ±1 in both reflection and transmission. Multilayers of a similar grating arrays are depicted in (b) and (c), where the centre-to-centre spacing of layers defines a Talbot length, c, for the case of normal incidence ($\theta_{in}$=0). A misalignment of the filament positions in rows a and b, $\Delta x_{a,b}$, is shown for zero and non-zero cases, in (b) and (c), respectively. The top view images of the filament end, d to e, refer to the respective cross-sectional views in a-c, where $\Lambda_x$ and $\Lambda_y$ define the periodic separation of the filaments in the x-axis and y-axis, respectively. In (c) and (d), the rows and columns are aligned in a grid, while in (d), the rows and columns are offset on $\Delta y_{c,d}$ and $\Delta x_{a,b}$, respectively. Here, $\Delta y_{c,d}$ defines the y axis offset between filament positions in layer c and layer d. The $\Delta y_{c,d}$ and $\Delta x_{a,b}$ offsets provide blaze-like grating efficiency effects to strengthen specific diffraction orders at target wavelengths of light.

FIG. 10 shows photos recorded from Talbot gratings having 3 layers of symmetric 2-D array of short laser modification tracks generated with a femtosecond laser at a wavelength of 515 nm and pulse energies of 21.5 nJ, 36.5 nJ, 58.5 nJ, 89.0 nJ, and 153.5 nJ. The laser exposure was focused into the polymer sample without inducing aberration by a glass plate, to keep the filament length smaller than the Talbot spacing (c) in all cases. All three images were recorded from the same sample, with varying incident angle while irradiated with a fixed white LED light and reflection detected at a fixed camera angle. The irradiation incident angle with respect to the normal of the sample surface increases from FIG. 8a to FIG. 8b to FIG. 8c. The laser was focused with a 0.55 NA aspherical lens to form a laser modification track shape with a layer of 2-D array of laser-modified tracks in the centre of the BOPP sample (i.e. 37.5 μm from the sample surface), and one layer of the same 2-D array above and one layer below by a lateral length (c) of 3.9 μm, 8.7 μm, and 15.5 μm with the transverse period ($\Lambda=\Lambda_x$, $\Lambda_y$) of 1.0 μm, 1.5 μm, and 2.0 μm, respectively.

The advantages of spectral filtering and enhancement due to the Talbot effect is noted by comparing the gratings patterned with the same pulse energy of 21.5 nJ, but optimized for two different Talbot configurations. In the first configuration of Talbot spacing of c=3.9 µm, and a transverse period of 1.0 µm (top row of grating images in FIG. 10a, b, c), a narrow spectrum is filtered and strongly reflected as expected, with the smaller incident angle enhancing short wavelength light (blue in FIG. 10a) that tunes to longer wavelength with larger incident angle (bluish-green in FIG. 10b to green in FIG. 10c). In the second configuration with larger periodic spacing of c=8.7 am and Λ=1.5 µm (second top row of grating images in FIG. 10a, b, c), red wavelength light at the edge of the visible spectrum is seen enhanced at the smallest incident angle in FIG. 10a. As the incident angle increases, the optical wavelength for constructive interference shifts toward the infrared, and shows barely visible red in FIG. 8b, while further angle increase begins to reveal short wavelength blue tones as the next diffraction order with lower diffraction efficiency comes into resonance in FIG. 8c. FIG. 11 provides optical microscope images showing the top view of a polymer sample exposed with a laser at pulse energies of from 21.5 nJ to 89.0 nJ and forming a 3D volume grating of short filaments, in three layers, with symmetric transverse periods, $\Lambda=\Lambda_x=\Lambda_y$, and Talbot period, c, given respectively at a) Λ=1.0 µm and c=3.9 µm, b) Λ=1.5 µm and c=8.7 µm, and c) Λ=2.0 µm and c=15.5 µm. In the case of (a), the optical resolution limits of imaging the filaments in a non-perfect transparent medium has been reached. With a small period and high pulse energy (i.e. Λ=1.0 µm with pulse energies of 36.5 nJ to 89.0 nJ, and Λ=1.5 µm with pulse energies of 58.5 nJ to 89.0 nJ), the charring and coalescing of laser modification zones lead to scattering of the incident light, providing a poor diffraction grating.

FIG. 13 shows optical top views (a, d) and cross-sectional SEM (b, c, e, f) images of two examples of a three-dimensional grating structure of laser-modified tracks formed over 3 layers near the middle of the 70-µm thick BOPP substrate. The examples demonstrate Talbot configurations with hexagonal crystal symmetry in (a) and tetragonal crystal structure in (d), and periodicities laterally of a=b=Λ (top views in a and d) and longitudinally of c≠a (cross-sectional views in b, c, e, and f). The whitish horizontal lines in (b) and (e) mark the centre of the film, being 35-µm from the top and bottom surfaces. The horizontal dotted lines in (a) and (d) mark the cleavage position of the film and the relative intersection positions of the laser-modified tracks, that down count the periodic observation of the vertical laser-modified track cross-sectional side-views, shown respectively in (b) and (c) and in (e) and (f).

In the first example formed with a lower pulse energy of 21.5 nJ, a structural period of Λ=2 µm is seen in (a) and a Talbot length of c=15.5 µm is seen over the three laser-modified track layers as shown in (b). This cross-sectional SEM image (b) has captured every third laser-modified track over all of the three layers of 2-D laser-modified track gratings. The zoomed-in SEM image of two filaments from a single layer in (c) reveals a laser realignment of the polymer chain from the predominant lateral direction in non-exposed volume to only vertical alignment in the laser exposure volume with length of ~5.5 µm and a diameter of ~0.7 µm. The low energy exposure was below the threshold for opening a cylindrically-shaped void, at least not with a diameter above the ~50 nm resolution limit here. In this exposure, only a modest contrast in refractive index on the level of several percent can be expected from the laser modification.

In the second example formed with smaller periods of Λ=1.5 µm laterally and c=8.7 µm vertically and higher pulse energy of 58.5 nJ, one observes a stronger morphological change in the top optical image view of FIG. 13 (d). The cleavage plane was more closely aligned with the lateral laser-modified track pattern, resulting in two of the three layers of tracks coming into view in the cross-sectional SEM view in (e). The filament tracks were aligned on the expected Λ=1.5 µm and c=8.7 µm periodicities. Under higher magnification of a single layer in (f), the cross-sectional SEM image confirms a vertical realignment of the polymer chain forming as the boundary around a cylindrical void shape of ~8.0 µm vertical length and ~0.8 µm diameter. The open structure formed by this stronger laser exposure will result in a much higher refractive index contrast of 0.5 µm in such three-dimensionally patterned volume gratings.

Example 7: Example of Grating Diffraction Efficiency with Short to Long Grating Length in Single Layer, and with Littrow and Talbot Effects in Multi Layers Two-dimensional laser-modified track arrays were laser fabricated in BOPP films over various laser pulse energies, grating periods (Λ and c), laser-modified track lengths, and number grating layers and assessed for their diffraction efficiency in the both reflection and transmission mode. The relative merits of short and long grating lengths, Littrow angle effects, and multi-layered Talbot resonances are presented in FIG. 18, showing plots of the combined $1^{st}$ order diffraction efficiency. Gratings were illuminated with collimated 520 nm wavelength light applied at normal incidence and Littrow angle for the cases of a single layer 2-D grating formed by (a) short laser-modified tracks and (b) long laser-modified tracks in transmission mode, and (c) short filaments in reflection mode. A further case of (d) three-layered gratings with short laser-modified track lengths were optimized for the 520 nm probe light by spacing the grating layers on the Talbot period of c=5.59 µm, and measured in transmission mode. The $1^{st}$ order diffraction efficiency is plotted as a function of grating period, Λ.

For the short laser-modified tracks (length shorter than 10 µm), the laser exposure was focused directly into the polymer (BOPP) sample without inducing aberration by a glass plate, whereas the long laser-modified tracks were fabricated by passing the focused laser through a 1-mm fused silica plate before entering into the sample, thereby elongating the filament modification track to more than 10 µm in length. For low refractive index contrast gratings fabricated with a low pulse energy of 23.5 nJ in (a), $1^{st}$ order diffraction efficiency is low for short laser-modified track length at normal incidence. The diffraction efficiency rises modestly to ~5.5% with increasing pulse energy to 31 nJ and 40 nJ due to stronger material modification that results in a higher refractive index contrast. With longer laser-modified track length, higher pulse energies were required to compensate for the spread of energy over a longer track length, leading to low 1st order diffraction efficiency for normal incidence as noted in (b). The results point to a low contrast in refractive index.

Generally, higher diffraction efficiencies were observed in transmission when probing at Littrow angles for both cases of (a) short and long (b) laser-modified tracks. An approximately 3-fold enhancement is noted for (a) short laser-modified tracks when spaced at a period of Λ=1.0 µm. Much larger enhancement factors of up to 10× were noted for the (b) long laser-modified track gratings with periods in the range of Λ=0.9 to 1.4 μm. The highest efficiency of 35% was observed at a period of Λ=1.2 μm and a pulse energy of 92.5 nJ.

In reflection from the same short-length laser-modified track grating in (a), only very weak $1^{st}$-order diffraction efficiencies (less than 0.5%) were observed at normal incidence as plotted in FIG. 18 (c). In contrast, Littrow angle provided a strong ~10-fold enhancement with 1st-order efficiencies up to ~5.7% being observed. Overall, the relatively low refractive index contrast and the single layer 2-D grating configuration resulted in overall provide poor diffraction efficiency. Using the Talbot effect to overcome this shortfall, one notes a strong Talbot enhancement effect in FIG. 18 (d) from the three-layered structure. For normal incidence, moderately strong diffraction efficiencies of ~17.2% (at 36.5 nJ) and ~31.4% (at 58.5 nJ) were observed at a period of 1.5 μm and 2.0 μm, respectively, attesting to the potential high diffraction efficiency available from a low refractive index contrast grating. The invention anticipates reaching much higher diffraction efficiencies (Example 5) by improving the grating structural design to optimizing the phase matching (i.e. grating Eq. 2 and 4) at different wavelengths and by controlling the filament length, refractive index contrast, and the Talbot length.

It is understood that the security devices and features, and methods for their production, and related technology employed in the illustrative embodiments may be modified in a variety of ways which will become readily apparent to those skilled in the art of having the benefit of the teachings disclosed herein. All such modifications and variations of the illustrative embodiments thereof shall be deemed to be within the scope and spirit of the present invention as defined, or defined in part, by the claims appended hereto.

REFERENCES

1. Booth, M. J., Neil, M. A. A. & Wilson, T. Aberration correction for confocal imaging in refractive-index-mismatched media. *Journal of Microscopy* 192, 90-98 (1998).
2. Rayner, D., Naumov, A. & Corkum, P. Ultrashort pulse non-linear optical absorption in transparent media. *Optics express* 13, 3208-3217 (2005).
3. Li, J., Ertorer, E. & Herman, P. R. Ultrafast laser burst-train filamentation for non-contact scribing of optical glasses. *Optics Express* 27, 25078 (2019).
4. Herman, P. R., Marjoribanks, R. & Oettl, A. Burst-ultrafast laser machining method.
5. Gattass, R. R. & Mazur, E. Femtosecond laser micromachining in transparent materials. *Nature photonics* 2, 219-225 (2008).
6. Shimotsuma, Y., Kazansky, P. G., Qiu, J. & Hirao, K. Self-organized nanogratings in glass irradiated by ultrashort light pulses. *Physical Review Letters* 91, 247405 (2003).
7. Taylor, R. S. et al. Femtosecond laser fabrication of nanostructures in silica glass. *Optics Letters* 28, 1043-1045 (2003).
8. Taylor, R., Hnatovsky, C. & Simova, E. Applications of femtosecond laser induced self-organized planar nanocracks inside fused silica glass. *Laser and Photonics Reviews* 2, 26-46 (2008).
9. Kumar, K. et al. Quantized structuring of transparent films with femtosecond laser interference. *Light: Science and Applications* 3, e157 (2014).
10. Couairon, A. & Mysyrowicz, A. Femtosecond filamentation in transparent media. *Physics Reports* 441, 47-189 (2007).
11. Bhuyan, M. K. et al. High aspect ratio nanochannel machining using single shot femtosecond Bessel beams. *Applied Physics Letters* 97, 081102 (2010).
12. Sugioka, K. & Cheng, Y. Ultrafast lasers-reliable tools for advanced materials processing. *Light: Science and Applications* 3, e149-e149 (2014).
13. Haque, M., Lee, K. K. C., Ho, S., Fernandes, L. A. & Herman, P. R. Chemical-assisted femtosecond laser writing of lab-in-fibers. *Lab on a Chip* 14, 3817-3829 (2014).
14. Wu, D. et al. In-channel integration of designable microoptical devices using flat scaffold-supported femtosecond-laser microfabrication for coupling-free optofluidic cell counting. *Light: Science and Applications* 4, e228 (2015).
15. Flamini, F. et al. Thermally reconfigurable quantum photonic circuits at telecom wavelength by femtosecond laser micromachining. *Light: Science and Applications* 4, e354-e354(2015).
16. Chen, F. & de Aldana, J. R. V. Optical waveguides in crystalline dielectric materials produced by femtosecond-laser micromachining. *Laser and Photonics Reviews* 8, 251-275 (2014).
17. Hosseini, S. A. & Herman, P. R. Method of material processing by laser filamentation.
18. Ahmed, F., Lee, M. S., Sekita, H., Sumiyoshi, T. & Kamata, M. Display glass cutting by femtosecond laser induced single shot periodic void array. *Applied Physics A: Materials Science and Processing* 93, 189-192 (2008).
19. Chung, S. H. & Mazur, E. Surgical applications of femtosecond lasers. *Journal of Biophotonics* 2, 557-572 (2009).
20. Booth, M. J. Adaptive optical microscopy: The ongoing quest for a perfect image. *Light: Science and Applications* 3, e165-e165 (2014).
21. Hnatovsky, C. et al. High-resolution study of photoinduced modification in fused silica produced by a tightly focused femtosecond laser beam in the presence of aberrations. *Journal of Applied Physics* 98, 013517 (2005).
22. Chen, Y. C. et al. Laser writing of coherent colour centres in diamond. *Nature Photonics* 11, 77-80 (2017).
23. Huang, L., Salter, P. S., Payne, F. & Booth, M. J. Aberration correction for direct laser written waveguides in a transverse geometry. *Optics Express* 24, 10565-10574 (2016).
24. Cumming, B. P. et al. Adaptive optics enhanced direct laser writing of high refractive index gyroid photonic crystals in chalcogenide glass. *Optics Express* 22, 689-698 (2014).
25. Osellame, R. et al. *Femtosecond writing of active optical waveguides with astigmatically shaped beams. Journal of the Optical Society of America B* 20, 1559-1567 (2003).
26. Ams, M., Marshall, G., Spence, D. & Withford, M. Slit beam shaping method for femtosecond laser direct-write fabrication of symmetric waveguides in bulk glasses. *Optics Express* 13, 5676-5681 (2005).
27. Salter, P. S. et al. Adaptive slit beam shaping for direct laser written waveguides. *Optics Letters* 37, 470-472 (2012).
28. Salter, P. S. & Booth, M. J. Focusing over the edge: adaptive subsurface laser fabrication up to the sample face. *Optics Express* 20, 19978-19989 (2012).

29. Ren, H., Lin, H., Li, X. & Gu, M. Three-dimensional parallel recording with a Debye diffraction-limited and aberration-free volumetric multifocal array. *Optics Letters* 39, 1621-1624(2014).
30. Xu, B. et al. High efficiency integration of three-dimensional functional microdevices inside a microfluidic chip by using femtosecond laser multifoci parallel microfabrication. *Scientific Reports* 6, 19989 (2016).
31. Zhang, C. et al. Optimized holographic femtosecond laser patterning method towards rapid integration of high-quality functional devices in microchannels. *Scientific Reports* 6, 1-9 (2016).
32. Mathis, A. et al. Micromachining along a curve: Femtosecond laser micromachining of curved profiles in diamond and silicon using accelerating beams. *Applied Physics Letters* 101, 71110 (2012).
33. Yamada, K., Watanabe, W., Toma, T., Itoh, K. & Nishii, J. In situ observation of photoinduced refractive-index changes in filaments formed in glasses by femtosecond laser pulses. *Optics Letters* 26, 19-21 (2001).
34. Kumagai, M. et al. Advanced dicing technology for semiconductor wafer-stealth dicing. *IEEE Transactions on Semiconductor Manufacturing* 20, 259-265 (2007).
35. Tamaki, T., Watanabe, W., Nishii, J. & Itoh, K. Welding of transparent materials using femtosecond laser pulses. *Japanese Journal of Applied Physics, Part 2: Letters* 44, L687-L689 (2005).
36. Duocastella, M. & Arnold, C. B. Bessel and annular beams for materials processing. *Laser and Photonics Reviews* 6, 607-621 (2012).
37. He, F. et al. Tailoring femtosecond 1.5-µm Bessel beams for manufacturing high-aspect-ratio through-silicon vias. *Scientific Reports* 7, 1-9 (2017).
38. Yao, Z. et al. Non-diffraction-length, tunable, Bessel-like beams generation by spatially shaping a femtosecond laser beam for high-aspect-ratio micro-hole drilling. *Optics Express* 26, 21960-21968 (2018).
39. Mishchik, K. et al. Improved laser glass cutting by spatio-temporal control of energy deposition using bursts of femtosecond pulses. *Optics Express* 25, 33271-33282 (2017).
40. Liu, X. et al. Front-surface fabrication of moderate aspect ratio micro-channels in fused silica by single picosecond Gaussian-Bessel laser pulse. *Applied Physics A: Materials Science and Processing* 124, 206 (2018).
41. Ashcom, J. B., Gattass, R. R., Schaffer, C. B. & Mazur, E. Numerical aperture dependence of damage and supercontinuum generation from femtosecond laser pulses in bulk fused silica. *Journal of the Optical Society of America B* 23, 2317-2322 (2006).
42. Lapointe, J. & Kashyap, R. A simple technique to overcome self-focusing, filamentation, supercontinuum generation, aberrations, depth dependence and waveguide interface roughness using fs laser processing. *Scientific Reports* 7, 1-13 (2017).
43. Kammel, R. et al. Enhancing precision in fs-laser material processing by simultaneous spatial and temporal focusing. *Light: Science and Applications* 3, e169-e169 (2014).
44. Vitek, D. N. et al. Spatio-temporally focused femtosecond laser pulses for nonreciprocal writing in optically transparent materials. *Optics express* 18, 24673-24678 (2010).
45. Salter, P. S. & Booth, M. J. Dynamic control of directional asymmetry observed in ultrafast laser direct writing. *Applied Physics Letters* 101, 141109 (2012).
46. Patel, A., Svirko, Y., Durfee, C. & Kazansky, P. G. Direct Writing with Tilted-Front Femtosecond Pulses. *Scientific Reports* 7, 1-14 (2017).
47. Yariv, A. Quantum Electronics. in 486-487 (Wiley, 1988).
48. Ertorer, E., Haque, M., Li, J. & Herman, P. R. Femtosecond laser filaments for rapid and flexible writing of fiber Bragg grating. *Opt. Express* 26, 9323-9331 (2018).
49. Müller, M. et al. 1 kW 1 mJ eight-channel ultrafast fiber laser. *Optics Letters* 41, 3439-3442 (2016).
50. Milam, D. Review and assessment of measured values of the nonlinear refractive-index coefficient of fused silica. *Applied Optics* 37, 546-550 (1998).
51. T. Clausnitzer, T. Kampfe, F. Bruckner, R. Heinze, E.-B. Kley, and A. Tunnermann, "Reflection-reduced encapsulated transmission grating," *Opt. Lett.*, vol. 33, no. 17, pp. 1972-1974, 2008.
52. Mi Li Ng, Debashis Chanda, and Peter R. Herman, "Coherent stitching of light in multilayered diffractive optical elements," Opt. Express, vol. 20, 23960-23970, 2012.
53. H. Talbot, "Facts relating to optical science," *Philos. Mag.*, vol. 9, p. 401, 1836.
54. D. Chanda and P. Herman, "Phase tunable multilevel diffractive optical element based single laser exposure fabrication of three-dimensional photonic crystal templates," *Appl. Phys. Lett.*, vol. 91, pp. 061122-1-3, 2007.

The invention claimed is:

1. A method for the manufacture of a security document or security device, the method comprising the steps of:
    providing a substrate sheet comprising a substrate sheet material;
    irradiating the substrate sheet at a plurality of discrete positions across a planar side of the substrate sheet corresponding to a two-dimensional array, with a laser beam from a femtolaser, whilst modifying the shape of the laser beam prior to its interaction with the substrate sheet so that the incident laser light is at least partially distributed along and / or about a laser propagation path extending within the substrate sheet;
    to at least partially or temporarily melt, displace or decompose at least a portion of the substrate material at or within an elongate volume of the substrate sheet material about the laser beam longitudinal axis, corresponding to each of said discrete positions,
    thereby to generate an array of laser-modified tracks within the substrate material,
    each laser-modified track comprising an elongate volume of modified substrate material at least 4 times longer than its width extending at least partially across a thickness of the substrate sheet, where the modified form of the substrate material has a refractive index that is different to the general refractive index n of the unmodified substrate;
    wherein each two-dimensional ordered array of laser-modified tracks thus produced collectively diffract light impinging on the substrate sheet to form an observable shape, image, or region of colour.

2. The method of claim 1, wherein for each laser-modified track the elongate volume of modified substrate material is at least 5 times longer than its narrowest width, and optionally the laser propagation path within the substrate sheet is linear, curved, or helical.

3. The method of claim 1, wherein each of the laser-modified tracks is generated by a femtolaser with a pulse duration in the range of 0.1 fs to 100 ps for each laser pulse, with beam-shaping of the femtolaser beam prior to its interaction with the substrate.

4. The method of claim 3, wherein the beam shaping of the femtolaser employs a lens or sheet between a source of the laser beam and a surface of the substrate.

5. The method of claim 4, wherein the beam shaping of the femtolaser employs a silica sheet between the source of the laser beam and the substrate.

6. The method of claim 1, wherein for at least some of the laser-modified tracks, the elongate volume of modified substrate material is within the substrate sheet.

7. The method of claim 1, wherein for at least some of the laser-modified tracks, the elongate volume of modified substrate material is exposed on at least one surface of the substrate sheet.

8. The method of claim 1, wherein for at least some of the laser-modified tracks the elongate volume of modified material in the substrate sheet includes a void in the substrate sheet, formed post-production of the substrate sheet, by melting, displacement or decomposition of a portion of the material of the substrate sheet.

9. The method of claim 1, wherein the substrate sheet has an average thickness of 10-3000 µm.

10. The method of claim 1, wherein the substrate sheet is a polymer sheet, and the each of the at least one ordered two-dimensional array of discrete laser-modified tracks comprises laser-modified tracks in the polymer, generated post-production of the polymer sheet.

11. The method of claim 10, wherein the substrate sheet comprises BOPP, BOPET, PEN, PP, PVDF, PVDF-TrFE, Nylon-55 or Nylon-66 or derivatives thereof.

12. The method of claim 10, wherein the polymer of the polymer sheet comprises polymer chains, wherein each elongate volume of modified substrate material for at least some of the laser-modified tracks comprises polymer chains that are at least partially aligned with one another relative to those of unmodified material of the polymer sheet, such that the modified material comprises aligned polymer chains that extend generally non-parallel to the surfaces of the polymer sheet, thereby to cause the modified substrate material to have a different refractive index relative to the general refractive index n for the unmodified material of the polymer sheet.

13. The method of claim 12, wherein the modified material comprises displaced polymer chains to create periodic voids, such that selected laser-modified tracks each comprise a void extending generally non-parallel to the surfaces of the polymer sheet, thereby to cause each of said tracks to have a different refractive index relative to the general refractive index n for the unmodified material of the polymer sheet.

14. The method of claim 12, wherein the polymer sheet comprises polymer chains that generally extend or are aligned non-parallel to the surfaces of the polymer sheet, due to melting, displacement or decomposition of the polymer within each elongate volume of modified substrate material in the polymer sheet.

15. The method of claim 12, wherein at least some of the aligned polymer chains within each elongate volume of modified substrate material of each laser-modified track extend or are aligned generally perpendicular to the surfaces of the polymer sheet.

16. The method of claim 12, wherein at least some of the aligned polymer chains within each elongate volume of modified substrate material of each laser-modified track extend to one or both surfaces of the polymer sheet.

17. The method of claim 12, wherein at least some of the aligned polymer chains within each elongate volume of modified substrate material of each laser-modified track extend within the polymer of the polymer sheet, but do not extend to the surfaces of the polymer sheet.

18. The method of claim 1, wherein the laser-modified tracks independently from one another extend within the polymer sheet from 5% to 100% of the distance between opposite surfaces of the polymer sheet, and optionally extend into one or more additional layers if present adjacent the polymer sheet.

19. The method of claim 1, wherein each elongate volume of modified substrate material of each laser-modified track is from 1-5000 nm in width on average, extending partially or entirely through the substrate sheet.

20. The method of claim 1, wherein one two-dimensional ordered array comprises laser-modified tracks that are separated from one another by a periodicity of from 0.01 to 1000 µm on average by the material of the unmodified material of the substrate sheet that has a general refractive index n.

21. The method of claim 1, wherein the substrate sheet comprises different sections each comprising a plurality of said laser-modified tracks, wherein the tracks within one section have different periodicities, lengths or orientations compared to tracks of at least one other section of the substrate sheet, such that the optical emissions of said different sections that result from diffraction of incident light differ from one another, when the same or equivalent incident light simultaneously impinges upon the different sections.

22. The method of claim 21, comprising pixel-like areas of the substrate at least some of which have different optical diffractive properties from one another, the pixel-like areas being from 1-10,000 µm across.

23. The method of claim 22, wherein each pixel-like area comprises multiple sub-sections each of which comprises an ordered array of said laser-modified tracks having a substantially consistent periodicity within each sub-section, the periodicity of the tracks extending within the sub-sections of any given pixel-like area being different to one another, such that the optical diffractive output of any given pixel-like area is defined by a combination of optical diffractive outputs for all subsections of that pixel-like area.

24. The method of claim 22, wherein each pixel-like area comprises sub-sections that each provide a red, green and blue optical diffractive output at selected angles upon exposure to incident light, the relative intensity of the red, green and blue outputs from the subsections of any given pixel-like area determining the colour of the combined optical diffractive output for that pixel-like area at a given angle.

25. The method of claim 21, comprising pixel-like areas of the substrate at least some of which have different optical diffractive properties from one another, the pixel-like areas being from 5-100 µm across.

26. The method of claim 1, wherein the substrate sheet comprises two or more ordered two-dimensional arrays of discrete laser-modified tracks, with the arrays at different depths relative to one another across a thickness of the substrate sheet,
    wherein a first array of laser-modified tracks at least partially overlies a second array of laser-modified tracks in the substrate sheet, when the substrate sheet is viewed in plan view from one side thereof,
    wherein the optical diffractive output of the first and second arrays, when viewed concurrently, exhibits an interference or diffractive optical effect.

\* \* \* \* \*